(12) United States Patent
Iwai et al.

(10) Patent No.: US 6,731,920 B1
(45) Date of Patent: May 4, 2004

(54) PORTABLE TELEPHONE APPARATUS AND CONTROL METHOD THEREOF

(75) Inventors: Hiroshi Iwai, Neyagawa (JP); Koichi Ogawa, Hirakata (JP); Kenichi Yamada, Yokohama (JP); Yoshio Koyanagi, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 204 days.

(21) Appl. No.: 09/980,000

(22) PCT Filed: Mar. 26, 2001

(86) PCT No.: PCT/JP01/02389

§ 371 (c)(1),
(2), (4) Date: Feb. 4, 2002

(87) PCT Pub. No.: WO01/76009

PCT Pub. Date: Oct. 11, 2001

(30) Foreign Application Priority Data

Mar. 31, 2000 (JP) .......................................... 2000-97345

(51) Int. Cl.[7] .............................. H04B 1/06; H04B 7/00
(52) U.S. Cl. .................... 455/272; 455/347; 455/575.7; 343/702
(58) Field of Search ................................ 455/90.3, 269, 455/272, 273, 274, 575.1, 575.7, 347; 343/702, 725, 726, 832, 833, 700 MS, 741

(56) References Cited

U.S. PATENT DOCUMENTS

| | | | | |
|---|---|---|---|---|
| 5,572,223 A | * | 11/1996 | Phillips et al. | ............... 343/702 |
| 5,613,224 A | * | 3/1997 | Auvray | ..................... 455/575.7 |
| 5,752,204 A | * | 5/1998 | Epperson et al. | ............ 455/347 |
| 6,061,579 A | * | 5/2000 | Arai et al. | ................ 455/575.7 |

FOREIGN PATENT DOCUMENTS

| | | |
|---|---|---|
| JP | 63-318826 | 12/1988 |
| JP | 09-214237 | 8/1997 |
| JP | 11-150496 | 6/1999 |
| JP | 2000-049649 | 2/2000 |
| JP | 2001-1129238 | 4/2001 |

OTHER PUBLICATIONS

Koichi Ogawa et al., entitled An Error Rate Performance of a π/4–Shift QPSK Signal for a Handset Diversity Influenced by Head, Hand and Shoulder Effects, Technical Report of IEICE (Institute of Electronics, Information and Communication Engineers in Japan), A •P 99–110, RCS 99–107, pp. 29–36, Oct. 1999.

(List continued on next page.)

*Primary Examiner*—Quochien B. Vuong
(74) *Attorney, Agent, or Firm*—Wenderoth, Lind & Ponack, L.L.P.

(57) ABSTRACT

A transmitting unit of a portable telephone apparatus transmits radio signals by using at least two antennas and simultaneously energizing those antennas with a predetermined amplitude ratio and a predetermined phase difference so that the direction of the main beam of a radiation pattern has a direction substantially opposite to that of the audio radiating direction from a speaker, and so that the mean effective gain is larger than that of when a single antenna is energized. The above energization of at least two antennas is formed only for transmission of telephone speech. A receiving unit of the portable telephone apparatus receives radio signals by using at least two antennas, and selectively receives, by the diversity receiving system, the radio signal having the highest level of those radio signals received by those antennas.

22 Claims, 17 Drawing Sheets

FIRST PREFERRED EMBODIMENT

OTHER PUBLICATIONS

Koichi Ogawa et al., entitled "Mean Effective Gain Analysis of a Diversity Antenna for Portable Telephone in Mobile Communication Environments", IEICE (Institute of Electronics, Information and Communication Engineers in Japan) Transaction, vol. J81–B–II, No. 10, pp. 897–905, Oct. 1998.

W. C. Jakes, entitled "Microwave Mobile Communications", pp. 133–158, IEEE Press, 1974.

Tokio Taga, entitled "Analysis for Mean Effective Gain of Mobile Antennas in Land Mobile Radio Environments", IEEE Transaction, vol. VT–39, No. 2, pp. 117–131, 1990.

* cited by examiner

FIRST MODIFIED PREFERRED EMBODIMENT

Fig. 10 SECOND MODIFIED PREFERRED EMBODIMENT

FOURTH MODIFIED PREFERRED EMBODIMENT

EXTERNAL ANTENNA 50

WHEN EXTERNAL ANTENNA 50 IS EXPANDED

WHEN EXTERNAL ANTENNA 50 IS HOUSED

SECOND PREFERRED EMBODIMENT

THIRD PREFERRED EMBODIMENT

FOURTH PREFERRED EMBODIMENT

FIFTH PREFERRED EMBODIMENT

PORTABLE TELEPHONE APPARATUS AND CONTROL METHOD THEREOF

TECHNICAL FIELD

The present invention relates to a portable telephone apparatus, and in particular, to a portable telephone apparatus for use in a portable telephone system and provided with at least two antennas.

BACKGROUND ART

A mobile communication system using a portable telephone set or the like has been rapidly developed in recent years. In general, a radio wave received by a mobile communication system is a multiple waves including a direct wave from a wave source and reflected waves from obstacles present in midway paths. In this case, the receiving sensitivity deteriorates due to fading. Therefore, a digital portable telephone system or the like performs diversity receiving in order to reduce the fading.

FIG. 19 is a block diagram showing a structure of a conventional portable telephone apparatus, and FIG. 20 is a perspective view showing an analysis model for simulating the portable telephone apparatus shown in FIG. 19.

Referring to FIG. 19, a whip antenna 202 of an external antenna extending upward from a feeding point 203 is provided on the top portion of the housing 201 of the portable telephone apparatus, the feeding point 203 of the whip antenna 202 is connected with a radio transmitter circuit 205 provided with a microphone 306 through a feeding cable 209 and the contact "a" of a transmitting and receiving switch 204, and is connected with a receiving diversity circuit 207 through the feeding cable 209 and the contact "b" of the transmitting and receiving switch 204. A planar inverted-F antenna 206 of an internal antenna built in the housing 201 and a radio receiver circuit 208 provided with a speaker 305 are connected with the receiving diversity circuit 207.

Referring to FIG. 20, a speaker 212 close to an ear of a human body of a user is provided on an upper portion of a front surface 201a of the portable telephone apparatus, and a microphone 211 close to a mouth of the human body is provided on a lower portion of the front surface 201a. Moreover, the whip antenna 202 is provided in the vicinity of one of four corners on a top surface of the housing 201 located at the upper portion of the speaker 212.

On the other hand, the planar inverted-F antenna 206 is provided in the housing 201 at an upper portion of a rear surface 201b which opposes to the front surface 201a. It is noted that since FIG. 20 shows an analysis model for simulation, the planar inverted-F antenna 206 is located outside of the rear surface 201b of the housing 201, however, in the case of an actual portable telephone apparatus, the planar inverted-F antenna 206 is provided so as to be located inside of the rear surface 201b of the housing 201. This planar inverted-F antenna 206 is constituted by comprising a rectangular conductor plate 206 supported by a feeding pin 206 so as to be parallel to the rear surface of the housing 201, a central portion of the upper side of the conductor plate 206 is connected with the receiving diversity circuit 207 illustrated in FIG. 19 through the feeding pin 206, and the central portion of the conductor plate 206 is grounded through a short-circuit pin 206c.

In the portable telephone apparatus constituted as described above, the transmitting and receiving switch 204 is switched over to the contact "a" side by a controller (not shown) of the portable telephone apparatus upon transmitting, and at this time, a radio signal modulated in accordance with an audio signal inputted to a microphone 306 is fed by being outputted to the whip antenna 202 from the radio transmitter circuit 205 through the transmitting and receiving switch 204. On the other hand, upon receiving, the transmitting and receiving switch 204 is switched over to the contact "b" side by the controller, and at this time, a radio signal received by the whip antenna 202 is inputted to the receiving diversity circuit 207 through the contact "b" of the transmitting and receiving switch 204, and a radio signal received by the planer inverted-F antenna 206 is inputted to the receiving diversity circuit 207. The receiving diversity circuit 207 selects a radio signal having a higher level out of the radio signal received by the whip antenna 202 and the radio signal received by the planar inverted-F antenna 206, and outputs the selected radio signal to the radio receiver circuit 208. Thereafter, the radio receiver circuit 208 demodulates the received radio signal so as to generate and output an audio signal from the speaker 305.

As described above, in the above-mentioned portable telephone apparatus, a radio signal having a higher level is selected out of signals received by two antennas 202 and 206 upon receiving, and only the whip antenna 202 is used upon transmitting.

In the analysis model of FIG. 20, the housing 201 had a rectangular-parallelepiped shape of 125 mm height, 35 mm width, and 20 mm depth, and at this time, the feeding point 203 of the whip antenna 202 was set to an origin of an XYZ coordinate system, and the longitudinal direction of the whip antenna 202 was set to the Z-axis direction. In this case, -X direction is a direction parallel to an audio (or voice)-radiating direction from the speaker 212, and is a direction directed to the head of a human body, in particular, to an ear of the human body. X direction is a direction opposite to the audio-radiating direction from the speaker 212.

FIGS. 21, 22, and 23 show radiating directivities on X-Y plane, X-Z plane, and Y-Z plane, respectively, in a free space of radio waves transmitted from the portable telephone apparatus shown in FIGS. 19 and 20.

In the above-mentioned simulation, a radiating directivity when exciting the whip antenna 202 by inputting a radio signal to the feeding point 203 was obtained by analyzing the directivity by the publicly-known moment method. In this case, the frequency of radio signals was set to 900 MHz, the housing 201, the whip antenna 202 and the planar inverted-F antenna 203 were each made of an electrical conductor, and the analysis model was equivalently replaced with a wire grid in order to reduce the calculation time to perform a simulation (for example, See Prior art document 1 of Koichi Ogawa et al., "An Error Rate Performance of a π/4-shift QPSK Signal for a Handset Diversity Influenced by Head and Shoulder Effects", Technical Report of IEICE (Institute of Electronics, Information and Communication Engineers in Japan), A-P 99–110, RC 88–107, October 1999").

As apparent from FIGS. 21 to 23, it is found that the θ-directional component $E_θ$ of the electric field on X-Y plane is almost omni-directional.

As described above, for example, the whip antenna 202 or the like is used as an external antenna of a portable telephone apparatus, however, it is preferable that the directivity of the antenna 202 is isotropic (omni-directional on the horizontal plane) so as to be able to receive even a signal transmitted from any direction upon waiting for reception. However, since the whip antenna 202 exists adjacent to the speaker 212, the directivity thereof is influenced by the human body such as an ear or a head thereof so that the directivity thereof deteriorates. Moreover, in this case, radio wave absorption by the head has been a large problem.

FIG. 24 is a side view showing a structure of a human body model carrying the portable telephone apparatus shown in FIGS. 19 and 20, and FIG. 25 is a front view showing a structure of a human body model carrying the portable telephone apparatus shown in FIGS. 19 and 20.

Referring to FIGS. 24 and 25, the human body model for simulation is constituted by comprising a head portion 302, a left shoulder portion 303 and a hand portion 304 in order to take into consideration the influence of the shoulder of the human body onto the radiating directivity of the antenna, and a half-length model constituted by integrating the head portion and the left shoulder portion is used as the human body model. In this case, the head 302 is approximated to a cylindrical shape having a diameter of 180 mm and a height of 250 mm, and the left shoulder 302 is approximated to a shape of trapezoidal column. In this case, in the left shoulder portion 303, the longitudinal section in the front and back direction of the human body is in a shape of trapezoidal. Moreover, the hand portion 304 of the human body model carrying the portable telephone apparatus has a shape of U-character having a thickness of 20 mm and a height of 80 mm, which is separated from the side surface of the housing 201 and the conductor plate 206 of the planar inverted-F antenna 203 by keeping an interval of 10 mm, and the hand portion 304 is provided so as to cover a lower portion of the housing 201. Moreover, on the assumption that the ear is located at the center P of the side surface of the head portion 302, the portable telephone apparatus is provided in such a state that it can be rotated about the center P of the side surface so that an interval between the head portion 302 and the housing 201 is set to 2 cm and the tilt angle of the longitudinal direction of the portable telephone apparatus from the vertical direction becomes 60 degrees. In this case, on the assumption that the portions 302, 303, and 304 of the human body model have a relative dielectric constant of 42, respectively, the human body model is equivalently replaced with a wire grid in order to reduce the calculation time to perform a simulation and obtain the radiating directivity when exciting the whip antenna 202 by inputting a radio signal to the feeding point 203 through analysis by the publicly-known moment method.

FIGS. 26, 27 and 28 are views showing radiating directivities transmitted from the portable telephone apparatus shown in FIGS. 19 and 20 when the potable telephone apparatus is carried by the human body model shown in FIGS. 24 and 25 on X-Y plane, X-Z plane, and Y-Z plane.

As apparent from comparing the results of FIGS. 26 to 28 with the results of FIGS. 21 to 23, it is found that the radiation pattern of the portable telephone apparatus when approaching to the human body is smaller than that in the case of the free space, and the radiating directivity deteriorates. From the above simulation, it was found that the loss of the power inputted to the whip antenna 202 due to the head portion 302 of the human body model became 18.3%, the loss of the power due to the left shoulder portion 303 of the human body model became 1.9%, the loss of the power due to the hand portion 304 of the human body model became 0.3%, and thus the loss of the power due to the head portion 302 of the human-body model accounts for approximately 20% of the total loss.

Moreover, the mean effective gain (MEG) Ge in the above case was calculated. The mean effective gain Ge is obtained by formulating the effective gain of an antenna moving in a multiple wave propagation path and is described as shown below in Prior art document 2 of Koichi Ogawa et al., "Mean Effective Gain Analysis of a Diversity Antenna for Portable Telephone in Mobile Communication Environments", IEICE (Institute of Electronics, Information and Communication Engineers in Japan) Transaction, Vol. J81-B-II, No. 10, pp. 897–905, October 1998.

That is, the mean effective gain Ge is represented by the following Equation:

$$Ge = \frac{P_{rec}}{P_1 + P_2} \tag{1}$$

where $P_{rec}$ denotes the mean receiving power of the antenna, $P_1$ denotes the mean receiving power in the multiple wave propagation path of the antenna having an isotropic directivity for a θ-component polarized wave, and $P_2$ denotes the mean receiving power in the multiple wave propagation path of an antenna having the isotropic directivity for a φ-component polarized wave. Therefore, $P_1+P_2$ denotes the total of incoming wave powers in the space in which the antenna is provided. The mean receiving power $P_{rec}$ is obtained in Prior art document 3 of W. C. Jakes, "Microwave Mobile Communications", pp. 133–140, IEEE Press, 1974", and it is represented by the following equation:

$$P_{rec} = \int_0^{2\pi} \int_0^{\pi} \{P_1 G_\theta(\Omega) P_\theta(\Omega) + P_2 G_\phi(\Omega) P_\phi(\Omega)\} d\Omega \tag{2}$$

where Ω denotes a coordinate point (θ, φ) in a spherical coordinate system, and d Ω=sinθdθdφ. $G_{\theta(\Omega)}$ and $G_\phi(\Omega)$ denote a θ component and φ component of the power gain directivity of the antenna, respectively. Moreover, $P_\theta(\Omega)$ and $P_\phi(\Omega)$ denote angle density functions for the θ component and the φ component of the incoming wave to the antenna. When defining the ratio of mean receiving powers received by the antenna having the isotropic directivity for the vertical (θ) and horizontal (φ) polarized waves as a cross polarization power ratio XPR, which is represented by the following equation:

$$XPR = \frac{P_1}{P_2} \tag{3}$$

The mean effective gain Ge is represented by the following equation (4) from the above equations (3) to (5) (for example, See Prior art document 4 of T. Taga, "Analysis for mean effective gain of mobile antennas in land mobile radio environments", IEEE Transaction, Vol. VT-39, No. 2, pp. 117–131, 1990):

$$Ge = \int_0^{2\pi} \int_0^{\pi} \left[ \frac{XPR}{1+XPR} G_\theta(\Omega) P_\theta(\Omega) + \frac{1}{1+XPR} G_\phi(\Omega) P_\phi(\Omega) \right] d\Omega \tag{4}$$

where $G_\theta(\Omega)$ and $G_\phi(\Omega)$ were obtained in accordance with the above-described wire grid model. Moreover, $P_\theta(\Omega)$ and $P_\phi(\Omega)$ were given by the following equations on the assumption that vertical and horizontal polarized wave components of the incoming wave were uniformly distributed in the azimuth direction and were Gauss-distributed in the elevation angle direction:

$$P_\theta = A_\theta \exp\left[-\frac{\{\theta - (\frac{\pi}{2} - m_V)\}^2}{2\sigma_V^2}\right] \text{ and} \quad (5),$$

$$P_\phi = A_\phi \exp\left[-\frac{\{\theta - (\frac{\pi}{2} - m_H)\}^2}{2\sigma_H^2}\right] \quad (6),$$

where $A_\theta$ and $A_\phi$ denote proportional constants, $m_V$ and $m_H$ denote mean elevation angles of respective polarized wave distributions of θ and φ, respectively, and $\sigma_V$ and $\sigma_H$ denote standard deviations of respective polarized wave components of θ and φ.

The mean effective gain Ge defined as described above was calculated using the above Equation (4) when making the portable telephone apparatus approach to the above human body model. In this case, on the assumption that the cross polarization power ratio XPR is equal to 6 (typical value in urban area), vertical and horizontal polarized wave components of the incoming wave are uniformly distributed in the azimuth direction, and elevation angles are Gauss-distributed in the direction of 30 degrees (it is generally known that elevation angles exist in a range from 0 to 40 degrees) with a standard deviation of 20 degrees, then the mean effective gain Ge in the radiating directivities shown in FIGS. 26 to 28 becomes −4.6 dBi which is comparatively small.

A first object of the present invention solves the above-mentioned problems, and is to provide a portable telephone apparatus provided with at least two antennas and a control method thereof, each of which is capable of reducing the radiation of radio signals in the audio radiating direction from the speaker.

Further, a second object of the present invention solves the above-mentioned problems and is to provide a portable telephone apparatus provided with at least two antennas and a control method thereof, each of which is capable of controlling a portable telephone apparatus so that the mean effective gain Ge can be further increased as compared with that in the case of the prior art.

DISCLOSURE OF THE INVENTION

In order to dissolve the above-mentioned problems, a portable telephone apparatus according to the present invention is characterized by comprising transmitting means for transmitting radio signals by simultaneously exciting at least two antennas with a predetermined amplitude ratio and a predetermined phase difference so that a main beam of a radiation pattern has a direction substantially opposite to an audio radiating direction from a speaker.

In the above-mentioned portable telephone apparatus, the transmitting means preferably transmits the radio signals by simultaneously exciting the respective antennas with a predetermined amplitude ratio and a predetermined phase difference so that an mean effective gain becomes larger than that when exciting one antenna.

Also, in the above-mentioned portable telephone apparatus, the transmitting means preferably excites the respective antennas only for transmission of telephone speech.

Further, the above-mentioned portable telephone apparatus preferably further comprises receiving means for receiving radio signals by using the at least two antennas, and selectively receiving a radio signal having the highest level among the radio signals received by the antennas, using a diversity receiving system.

Furthermore, in the above-mentioned portable telephone apparatus, the at least two antennas preferably include an external antenna provided outside of a housing of the portable telephone apparatus, and an internal antenna built in the housing of the portable telephone apparatus.

In the above-mentioned portable telephone apparatus, the external antenna is a half-wave whip antenna, and the internal antenna is a planar inverted-F antenna. In this case, the external antenna is constituted by a whip antenna and a helical antenna which are mechanically joined with each other so as to be electrically insulated from each other, wherein the helical antenna is connected with a radio circuit of the portable telephone apparatus when the external antenna is housed in the housing of the portable telephone apparatus, while the whip antenna is connected with the radio circuit of the potable telephone apparatus when the external antenna is extended, wherein the potable telephone apparatus further comprises detecting means for detecting whether or not the external antenna is housed in the housing of the portable telephone apparatus, and wherein the transmitting means simultaneously excites the external antenna and the internal antenna with the predetermined amplitude ratio and the predetermined phase difference so that the main beam of the radiation pattern has the direction substantially opposite to the audio radiating direction from the speaker when it is detected by the detecting means that the external antenna is housed in the housing of the portable telephone apparatus, while the transmitting means excites only the external antenna when it is detected by the detecting means that the external antenna is not housed in the housing of the portable telephone apparatus.

Also, in the above-mentioned portable telephone apparatus, the transmitting means excites the at least two antennas with phases opposite to each other.

Further, in the above-mentioned portable telephone apparatus, the above-mentioned at least two antennas preferably include two quarter-wave antennas. Otherwise, the above-mentioned at least two antennas preferably include two half-wave antennas. Alternatively, in the above-mentioned potable telephone apparatus, preferably, the above-mentioned at least two antennas are internal antennas built in the housing of the portable telephone apparatus.

A control method of a telephone apparatus according to the present invention is characterized by including a step of:

transmitting and controlling so as to transmit radio signals by simultaneously exciting at least two antennas with a predetermined amplitude ratio and a predetermined phase difference so that a main beam of a radiation pattern has a direction substantially opposite to an audio radiating direction from a speaker.

In the above-mentioned control method of the telephone apparatus, the step of transmitting and controlling preferably transmits the radio signals by simultaneously exciting the respective antennas with a predetermined amplitude ratio and a predetermined phase difference so that an mean effective gain becomes larger than that when exciting one antenna.

Accordingly, the present invention makes it possible to realize a radiating directivity for strongly radiating radio waves in the direction opposite to a head of a human body of a user, so that deterioration of the radiating directivity of the antenna can be reduced when making a portable telephone apparatus approach to the human body. Moreover, it is possible to realize the radiating directivity of the antenna suitable for a multi-path waves propagation environment.

BEST MODE FOR CARRYING OUT THE INVENTION

Preferred embodiments according to the present invention will be described hereinafter in detail with reference to the attached drawings.

FIRST PREFERRED EMBODIMENT

Figure 1:
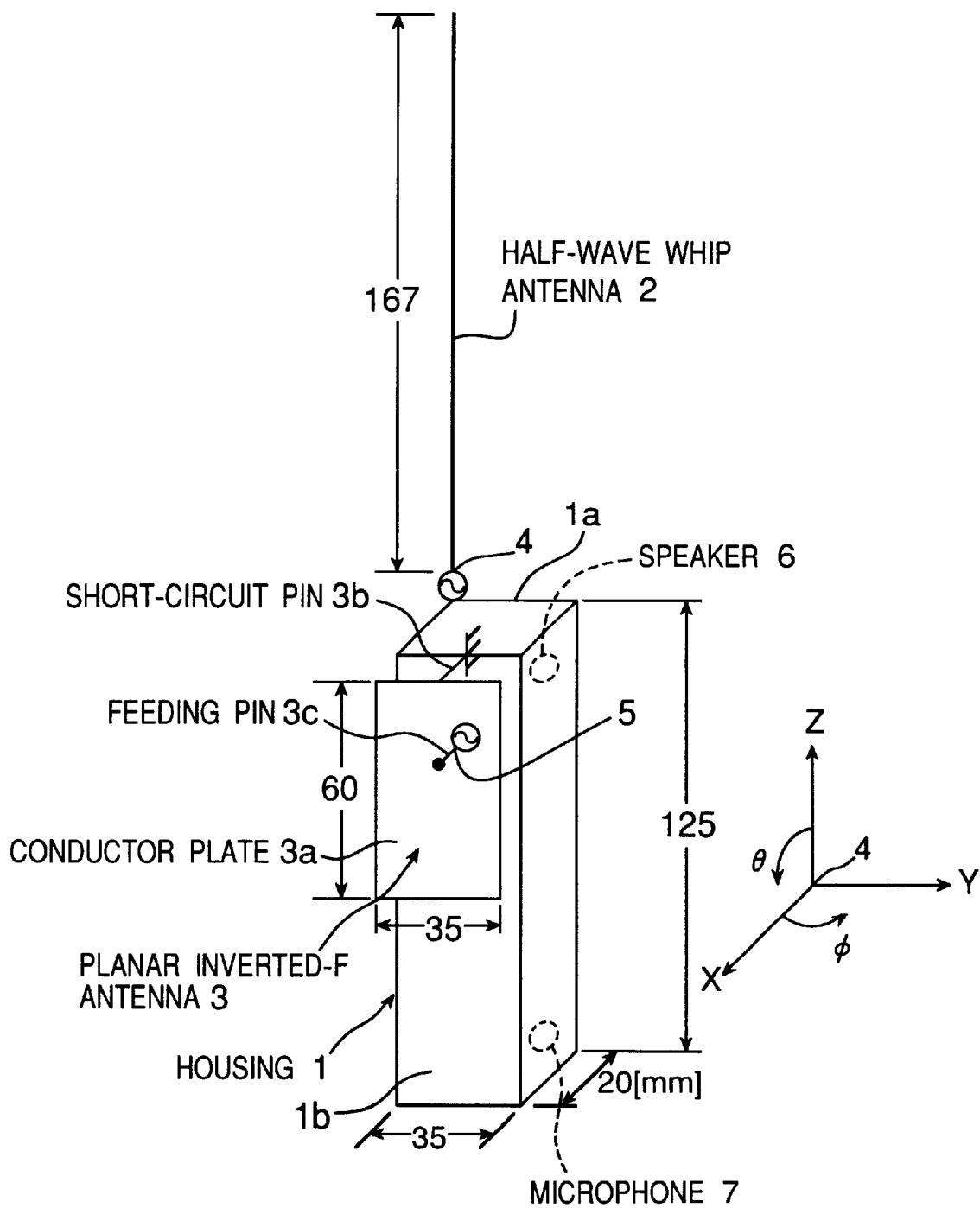
FIG. 1 is a schematic perspective view showing an analysis model for simulating a portable telephone apparatus which is a first preferred embodiment according to the present invention.
Figure 2:
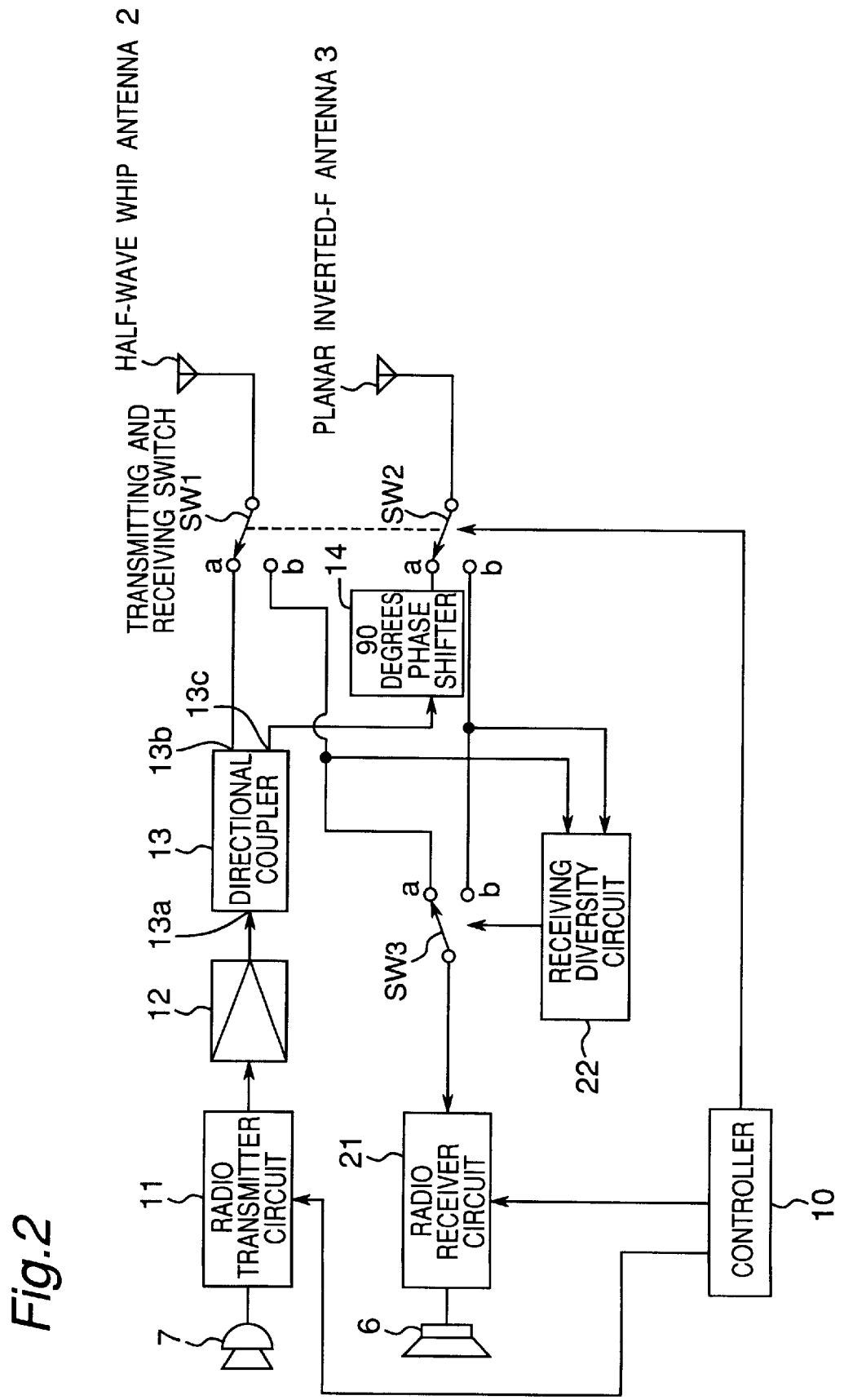
FIG. 2 is a block diagram showing a circuit structure of the portable telephone apparatus shown in FIG. 1.

FIG. 1 is a schematic perspective view showing a portable telephone apparatus which is a first preferred embodiment according to the present invention by using an analysis model for simulation, and FIG. 2 is a block diagram showing a circuit structure of the portable telephone apparatus shown in FIG. 1. The portable telephone apparatus according to this embodiment is a portable telephone apparatus which is applied to a TDMA system and is characterized by simultaneously exciting a half-wave whip antenna 2 and a planar inverted-F antenna 3 so that a main beam of a radiation pattern has a direction substantially opposite to an audio radiating direction from a speaker 6 and an mean effective gain Ge becomes larger than that of the prior art, thereby transmitting a radio signal.

Referring to FIG. 1, the whip antenna 2 is provided adjacent to one of four corners on the top surface of the housing 1 of the portable telephone apparatus so as to extend upward from a feeding point 4 located on the top surface. The speaker 6 close to an ear of a human body of a user is provided on an upper portion of a front surface 1a of the portable telephone apparatus, and a microphone 7 close to a mouth of the human body is provided on a lower portion thereof.

In addition, the planar inverted-F antenna 3 is provided in the housing 1 which is an upper portion of a rear surface 1b of the housing 1 opposing to the front surface 1a. It is noted that since FIG. 1 shows an analysis model for simulation, the planar inverted-F antenna 3 is located outside of the rear surface 1b of the housing 1, however, in the case of an actual portable telephone apparatus, the planar inverted-F antenna 3 is provided so as to be located inside of the rear surface 1b of the housing 1. The planar inverted-F antenna 3 is constituted by comprising a rectangular conductor plate 3a supported by a short-circuit pin 3b grounded so as to be parallel to the rear surface of the housing 1, and the central portion of the conductor plate 3a is connected with a common terminal of a transmitting and receiving switch SW2 shown in FIG. 2 through a feeding pin 3c and a feeding point 5.

Referring to FIG. 2, an audio (or voice) inputted to the microphone 7 is converted into an audio signal, which is then inputted to the radio transmitter circuit 11. The radio transmitter circuit 11 modulates a carrier signal in accordance with the inputted audio signal to generate a radio signal, and then, outputs the radio signal to a directional coupler 13 through a power amplifier 12. The directional coupler 13 has one input terminal 13a and two output terminals 13b and 13c. When the radio signal is inputted to the input terminal 13a, the directional coupler 13 distributes the radio signal inputted to the input terminal 13a with a distribution power ratio of 2:1, and then, outputs one distributed radio signal from the output terminal 13b and outputs another distributed radio signal from the output terminal 13c. It is noted that the distribution power ratio of the directional coupler 13 is predetermined before manufacturing, for example, and it is set by adjusting the coupling interval between two lines so that the distribution power ratio can be obtained upon manufacturing. The radio signal outputted from the output terminal 13b of the directional coupler 13 is outputted to the half-wave whip antenna 2 through the contact "a" side of a transmitting and receiving switch SW1, and the electromagnetic wave of the radio signal is radiated from the half-wave whip antenna 2. Further, the radio signal outputted from the output terminal 13c of the directional coupler 13 is outputted to the planar inverted-F antenna 3 through a 90 degrees phase shifter and the contact "a" side of the transmitting and receiving switch SW2, and the electromagnetic wave of the radio signal is radiated from the planar inverted-F antenna 3.

On the other hand, the radio signal received by the half-wave whip antenna 2 is inputted to a receiving diversity circuit 22 through a contact "b" side of the transmitting and receiving switch SW1, and it is further inputted to a radio receiver circuit 21 through the contact "b" of a diversity switch SW3. Further, the radio signal received by the planar inverted-F antenna 3 is inputted to the receiving diversity circuit 22 through the contact "b" side of the transmitting and receiving switch SW2, and it is further inputted to the radio receiver circuit 21 through the contact "b" side of the diversity switch SW3. In this case, the receiving diversity circuit 22 selectively switches the diversity switch SW3 so as to select a radio signal having a higher level out of the radio signal received by the whip antenna 2 and the radio signal received by the planar inverted-F antenna 3, and then, outputs the selected radio signal to the radio receiver circuit 21. Thereafter, the radio receiver circuit 21 demodulates the received radio signal so as to generate and output an audio signal from the speaker 6.

Moreover, a controller 10 controls operations of a radio transmitter circuit 11 and a radio receiver circuit 21, switches over both of the transmitting and receiving switches SW1 and SW2 to the contact "a" side thereof, interlockingly, upon transmitting for telephone speech, upon transmitting of electric mail or upon transmitting the control signal such as location registration or the like, and both of the half-wave whip antenna 2 and the planar inverted-F antenna 3 are simultaneously excited by outputting the radio signal to be transmitted to these two antennas 2 and 3, thereby transmitting the radio signal. Upon this transmitting, since the distribution power ratio is set to 2:1 in the directional coupler 13 and 90 degrees phase shifting process is performed only for the radio signal radiated from the planar inverted-F antenna 3, the radiation pattern from the mobile telephone apparatus is steered in a predetermined direction. The description about this will be described in detail later.

On the other hand, the controller 10 switches over both of the transmitting receiving switches SW1 and SW2 to the contact "b" side thereof, interlockingly, upon transmitting and receiving for telephone speech, or upon receiving of the control signal, then selectively receives a radio signal having a higher level selected by the receiving diversity circuit 22 out of the radio signal received by the half-wave whip antenna 2 and the radio signal received by the planar inverted-F antenna 3, and thereafter, the demodulation process is performed for the radio signal by the radio receiver circuit 21.

Figure 20:
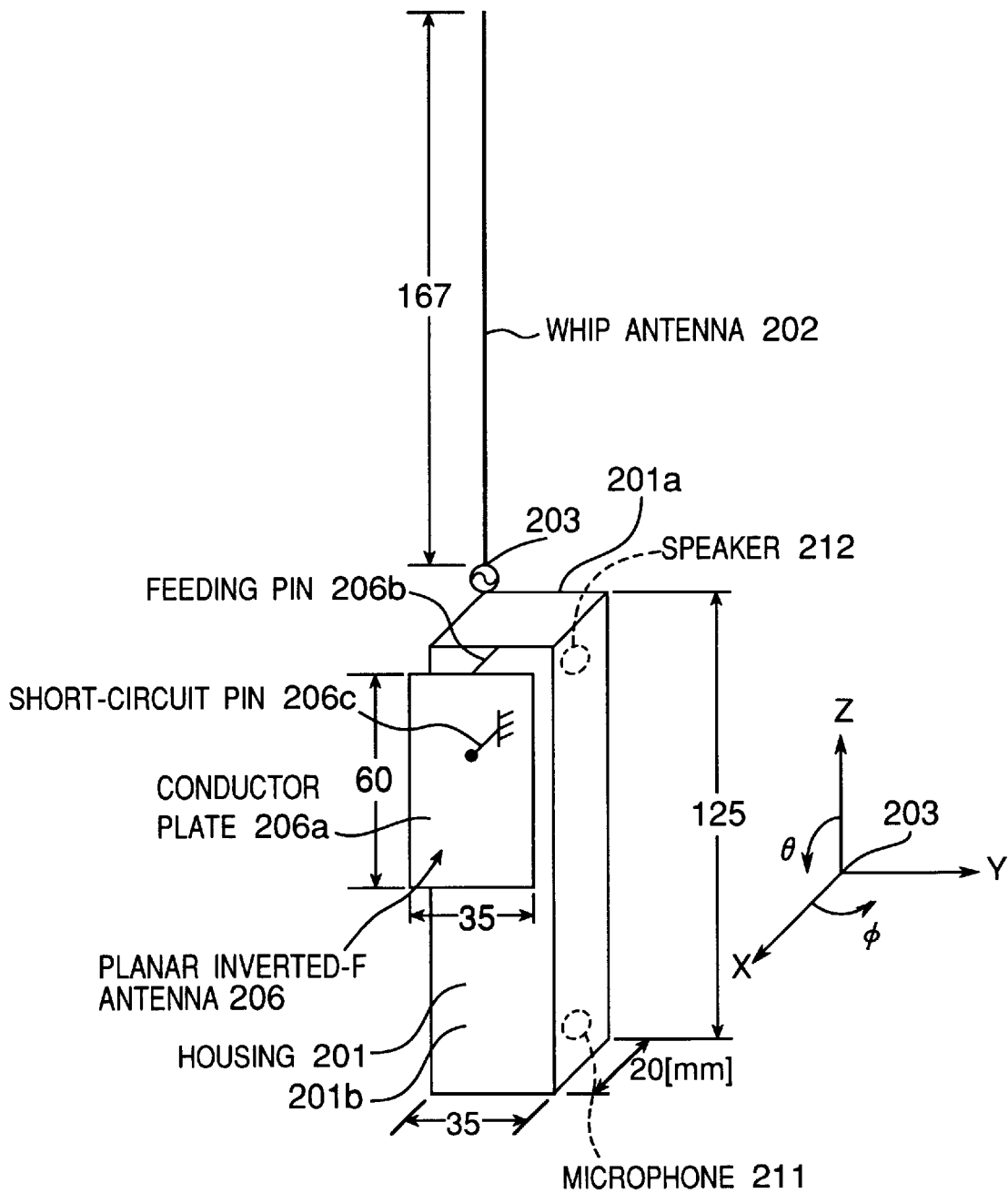
FIG. 20 is a perspective view showing an analysis model for simulating the portable telephone apparatus shown in FIG. 19.
Figure 21:
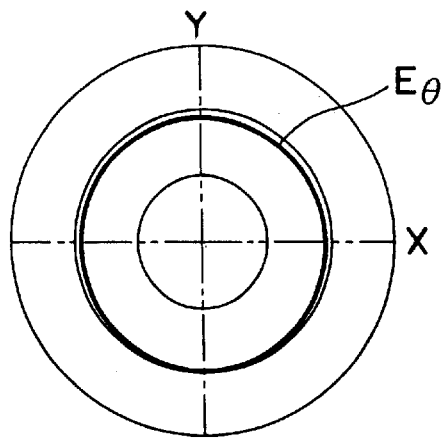
FIG. 21 is a diagram showing a radiating directivity on X-Y plane in a free space of a radio wave transmitted from the portable telephone apparatus shown in FIGS. 19 and 20.
Figure 22:
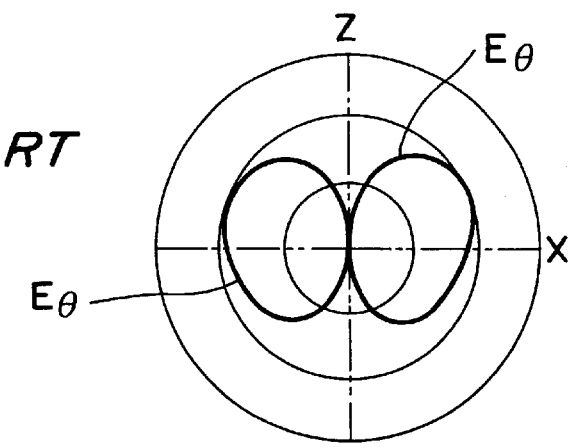
FIG. 22 is a diagram showing a radiating directivity on X-Z plane in the free space of the radio wave transmitted from the portable telephone apparatus illustrated in FIGS. 19 and 20.
Figure 23:
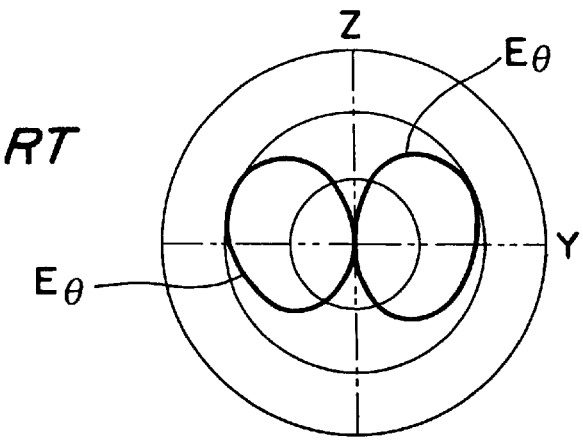
FIG. 23 is a diagram showing a radiating directivity on Y-Z plane in the free space of the radio wave transmitted from the portable telephone apparatus shown in FIGS. 19 and 20.

The housing 1 of the portable telephone apparatus according to the present preferred embodiment has dimensions similar to those of the housing 201 of the conventional portable telephone apparatus shown in FIG. 20, that is, it has a rectangular-parallelepiped shape having a length of 125 mm, a width of 35 mm, and a height of 2 mm. At that time, the feeding point 4 of the half-wave whip antenna 2 is set to an origin of an XYZ coordinate system, and the longitudinal direction of the half-wave whip antenna 2 is set to Z-axis direction. In this case, -X direction is a direction parallel to the audio radiating direction from the speaker 6, and a direction directed to the head portion of the human body from the speaker 6, in particular, to the ear thereof. X direction is a direction opposite to the audio radiating direction from the speaker 6.

Figure 3:
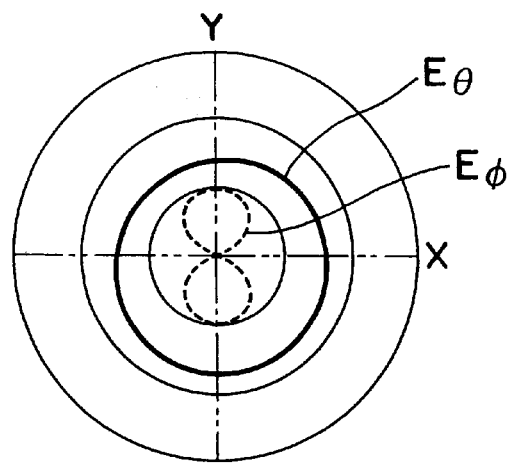
FIG. 3 is a diagram showing a radiating directivity on X-Y plane in a free space of a radio wave transmitted from the portable telephone apparatus shown in FIG. 1.
Figure 4:
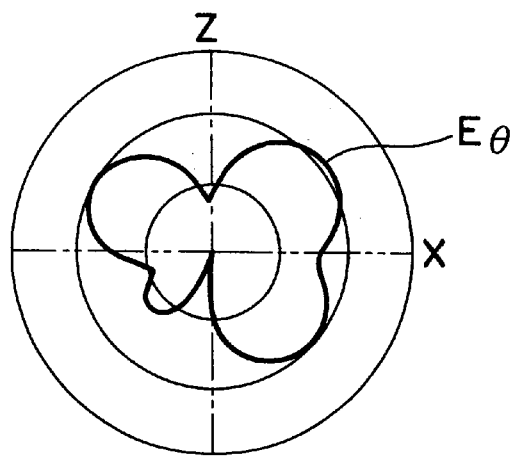
FIG. 4 is a diagram showing a radiating directivity on X-Z plane in the free space of the radio wave transmitted from the portable telephone apparatus shown in FIG. 1.
Figure 5:
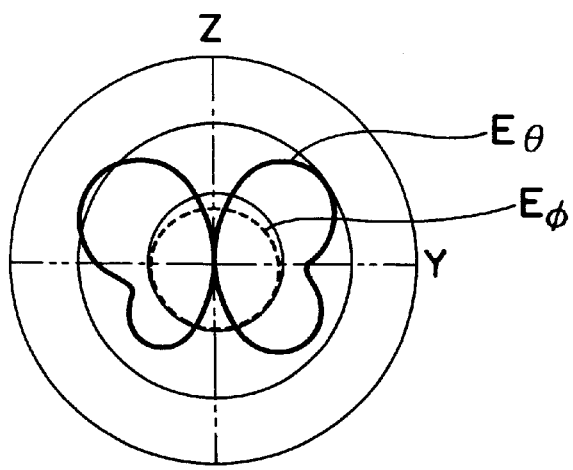
FIG. 5 is a diagram showing a radiating directivity on Y-Z plane in the free space of the radio wave transmitted from the portable telephone apparatus shown in FIG. 1.

FIGS. 3, 4, and 5 are diagrams showing radiating directivities on X-Y plane, X-Z plane, and Y-Z plane in a free space of radio waves transmitted from the portable telephone apparatus shown in FIG. 1, respectively. It is apparent from FIGS. 3 to 5, it is found that an $E_\theta$ component of Z-X plane becomes weak in -X direction (the audio radiating direction from the speaker 6 directed to the head portion of the human body, in particular, to the ear thereof).

Figure 6:
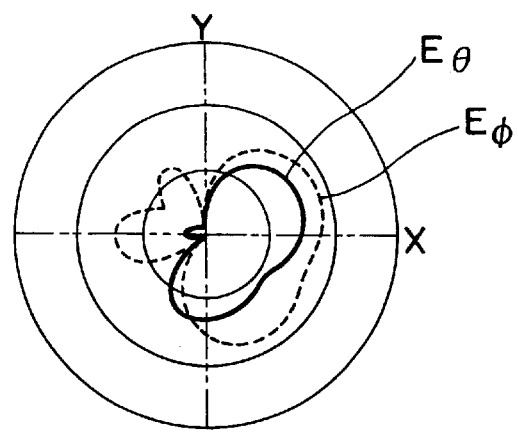
FIG. 6 is a diagram showing a radiating directivity transmitted from the portable telephone apparatus shown in FIG. 1 on X-Y plane when making the portable telephone apparatus approach to a human body model shown in FIGS. 24 and 25.
Figure 7:
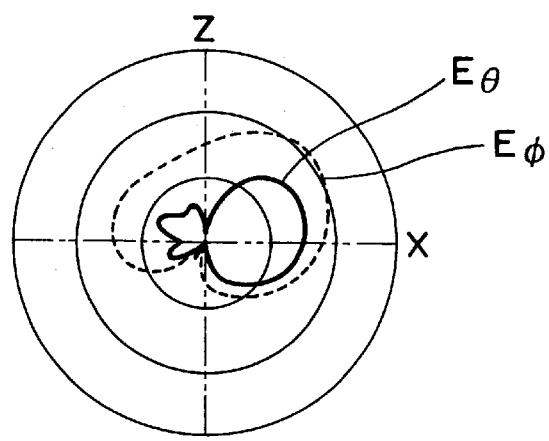
FIG. 7 is a diagram showing a radiating directivity transmitted from the portable telephone apparatus shown in FIG. 1 on X-Z plane when making the portable telephone apparatus approach to the human body model shown in FIGS. 24 and 25.
Figure 8:
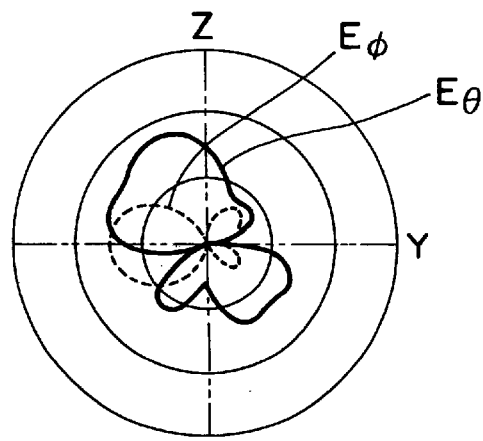
FIG. 8 is a diagram showing a radiating directivity transmitted from the portable telephone apparatus shown in FIG. 1 on Y-Z plane when the portable telephone apparatus is carried by the human body model shown in FIGS. 24 and 25.
Figure 24:
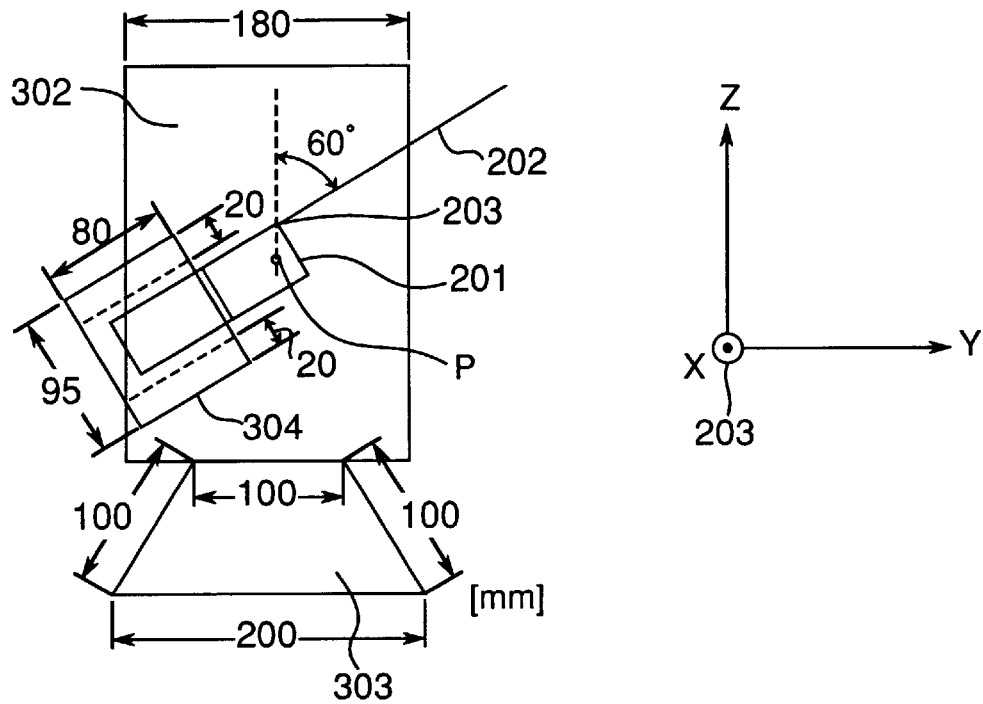
FIG. 24 is a side view showing a structure of a human body model carrying the portable telephone apparatus shown in FIGS. 19 and 20.
Figure 25:
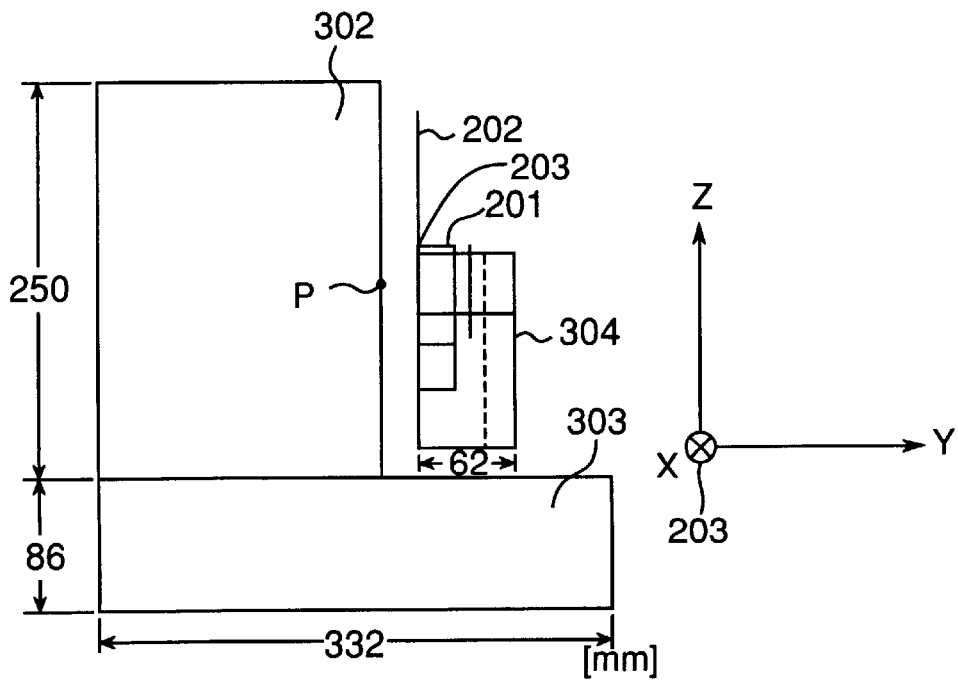
FIG. 25 is a front view showing a structure of a human body model carrying the portable telephone apparatus shown in FIGS. 19 and 20.

FIGS. 6, 7, and 8 are diagrams showing radiating directivities transmitted from the portable telephone apparatus shown in FIG. 1 on X-Y plane, X-Z plane, and Y-Z plane, respectively, when making the portable telephone apparatus approach to the human body model shown in FIGS. 24 and 25. In this case, when FIGS. 6 to 8 according to the embodiment are compared with FIGS. 26 to 28 according to the prior art, it is found that the radiation pattern on X-Y plane of the embodiment of FIG. 6 is remarkably weak in radiation in -X direction. At this time, it is found that the main beam of the radiation pattern on X-Y plane is substantially directed to X direction (the direction opposite to the audio radiating direction from the speaker 6). At this time, the loss due to a head portion 302 of the human body model becomes 11.0% of the radiation power inputted to the two antennas 2 and 3, the loss due to a left shoulder portion 303 of the model becomes 3.6% of the radiation power, and the loss due to a table 304 of the model becomes 19.5% of the radiation power. From the above fact, it is found that the loss due to the head portion 302 is almost halved as compared with that in the case of the omni-directional antenna.

Figure 26:
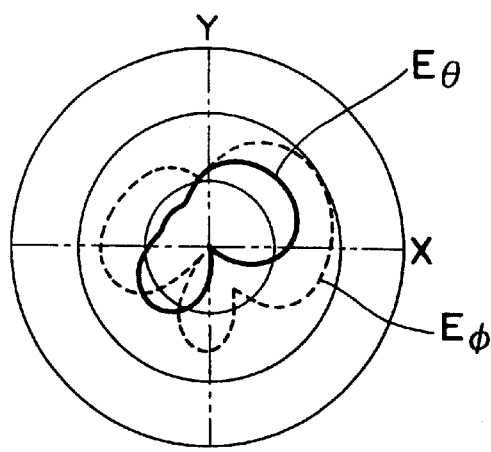
FIG. 26 is a diagram showing a radiating directivity transmitted from the portable telephone apparatus shown in FIGS. 19 and 20 on X-Y plane when the portable telephone apparatus is carried by the human body model shown in FIGS. 24 and 25.
Figure 27:
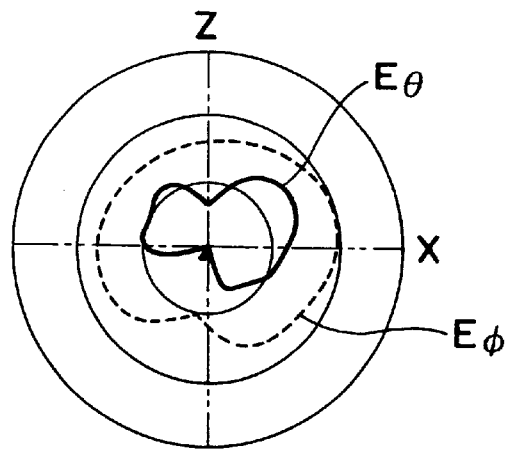
FIG. 27 is a diagram showing a radiating directivity transmitted from the portable telephone apparatus shown in FIGS. 19 and 20 on X-Z plane when the portable telephone apparatus is carried by the human body model shown in FIGS. 24 and 25.
Figure 28:
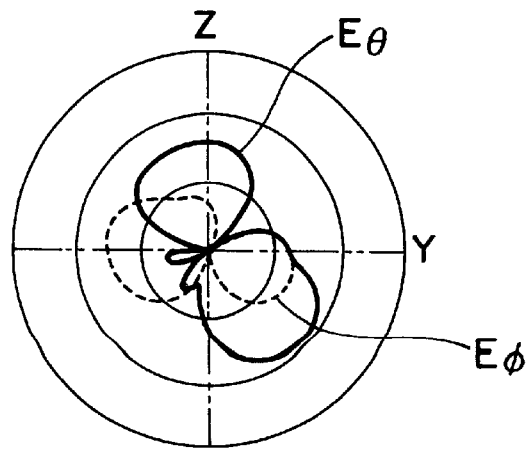
FIG. 28 is a diagram showing a radiating directivity transmitted from the portable telephone apparatus shown in FIGS. 19 and 20 on Y-Z plane when the portable telephone apparatus is carried by the human body model shown in FIGS. 24 and 25.

Moreover, when the mean effective gain Ge of the radiating directivities shown in FIGS. 26 to 28 is calculated in a manner similar to that of the prior art, the means effective gain Ge becomes −4.5 dBi, and therefore, it is possible to increase the mean effective gain Ge as compared with that in the case of the prior art.

It is to be noted that the loss due to the hand portion 304 remarkably increases as compared with that in the case of the omni-directional antenna since the length of the whip antenna 2 is set to half the wavelength, a housing current hardly flows through the feeding section 4 when considering the current distribution in the whip antenna 2, and this is not related to weakening of radiation toward the head portion 302. In this case, when using the whip antenna 2 having the longitudinal length of ⅜ or ¼ wavelengths etc., the loss due to the hand portion 304 increases since a housing current flows also when exciting only the whip antenna 2.

As described above, according to the present preferred embodiment, since the whole antenna gain is increased by exciting the half-wave whip antenna 2 and planar inverted-F antenna 3 at the same time and transmitting a radio signal, and the radio signal is transmitted by exciting these two antennas 2 and 3 at the same time with a predetermined amplitude ratio and a predetermined phase difference so that the main beam of the radiation pattern has a direction substantially opposite to the audio radiating direction from the speaker 6, it is therefore possible to realize a radiation pattern for strongly radiating radio waves in the direction opposite to the direction directed to the head portion of the human body, to reduce the influence on the human body as compared with that in the case of the prior art, and in particular to remarkably suppress the amount of radio waves absorbed by the head of the human body.

Moreover, by simultaneously exciting these two antennas 2 and 3 so that the mean effective gain Ge increases as compared with that in the case of the prior art, the radio signal is transmitted, therefore, it is possible to effectively utilize the transmission radiation power and realize an antenna characteristic suitable for multiple waves propagation environment.

Furthermore, since the radio signal having highest level is selectively received by using the receiving diversity circuit 22 upon receiving of the radio signal, the receiving sensitivity can be improved. In other words, the two antennas 2 and 3 are used for simultaneous excitation upon transmitting of the radio signal, while the two antennas 2 and 3 are used for the diversity receiving system upon receiving of the radio signal, and thus, the two antennas are well separately used for transmission and reception, and the two antennas are effectively used.

Furthermore, it may be allowed to change the amplitude ratio and the phase difference between the two antennas 2 and 3 to be simultaneously excited only upon transmitting for telephone speech when it is a high possibility that the head portion of the human body approaches the portable telephone apparatus. On the other hand, it may be controlled by a controller so that the radio signal is received selectively using only one antenna and using the diversity receiving system. This leads to that it has the isotropic directivity upon waiting for receiving when the human body does not approach the portable telephone apparatus, the influence by the human body becomes small upon transmitting for telephone speech when the human body approaches it, and thus, the directivity suitable for the multiple waves propagation environment can be realized.

In the above-mentioned first preferred embodiment, the two antennas 2 and 3 are simultaneously excited so that the amplitude ratio becomes 2:1 and the phase difference becomes 90 degrees, however, the present invention is not limited to this. It may be so constituted that these two antennas 2 and 3 are simultaneously excited with a predetermined amplitude ratio and a predetermined phase difference so that the main beam of the radiation pattern has the direction substantially opposite to the audio radiating direction from the speaker 6.

In the above-mentioned first preferred embodiment, the 90 degrees phase shifter 14 is used, however, the present invention is not limited to this. It is possible to change the phase difference between the radio signals for exciting two antennas 3 and 4 by changing the phase shifting amount of the phase shifter 14.

In the above-mentioned first embodiment, there is shown an example in which the mean effective gain Ge is calculated by setting the cross polarization power ratio XPR to 6 and setting the elevation angle of the incoming wave to 30 degrees, however, the present invention is not limited to this.

FIRST MODIFIED PREFERRED EMBODIMENT

Figure 9:
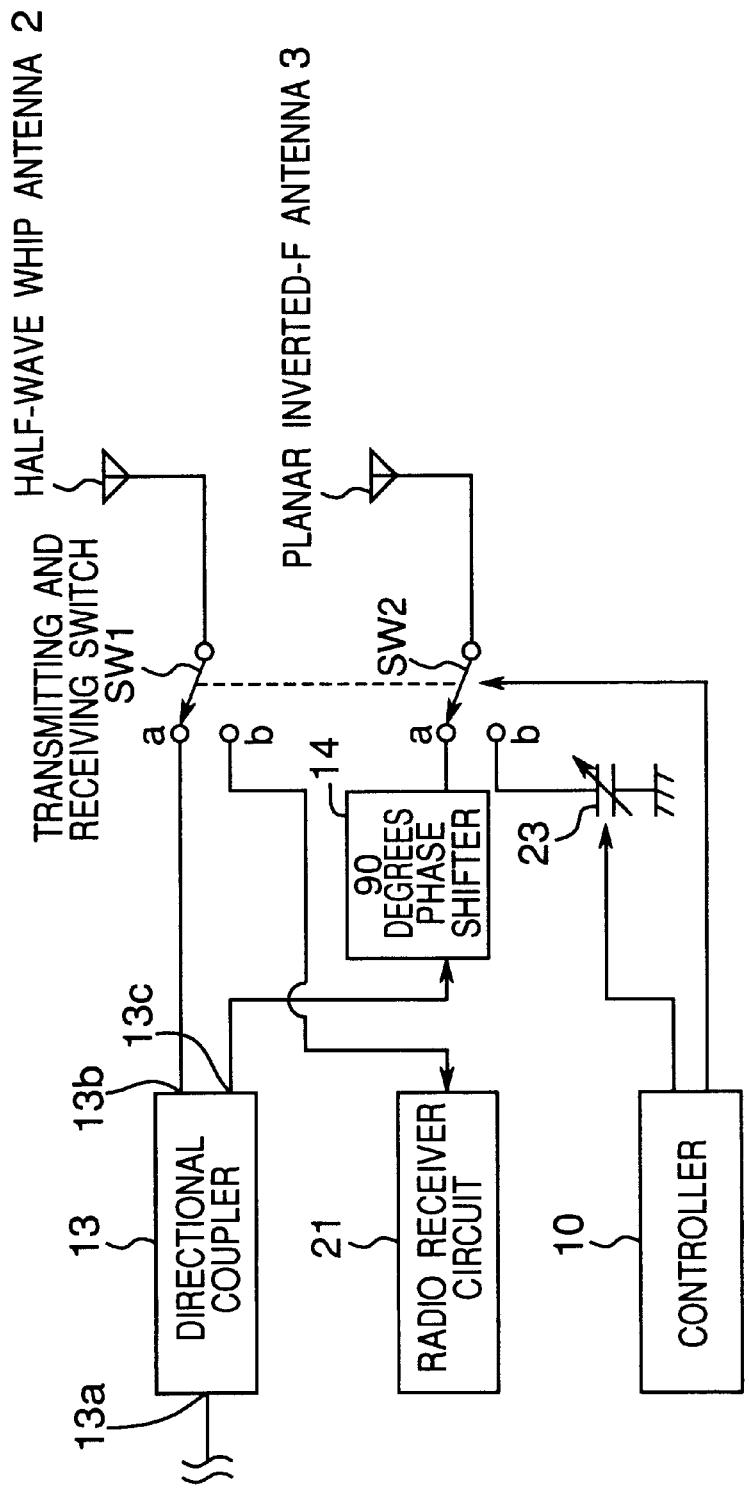
FIG. 9 is a block diagram showing a circuit structure of a portable telephone apparatus which is a first modified preferred embodiment according to the present invention.

FIG. 9 is a block diagram showing a circuit structure of a portable telephone apparatus which is a first modified preferred embodiment according to the present invention. In FIG. 9, the components similar to those of FIG. 2 are denoted by the same numerical references of FIG. 2, and the detailed description thereof is omitted. The first modified preferred embodiment is different from the first preferred embodiment shown in FIG. 2 in the following points.

(1) The receiving diversity circuit 22 is not provided.
(2) A variable reactance element 23 is provided.

These difference points will be described in detail hereinafter.

Referring to FIG. 9, a radio signal received by the half-wave whip antenna 2 is directly inputted to the radio receiver circuit 21 through the contact "b" side of the transmitting and receiving switch SW1. Moreover, a radio signal received by the planar inverted-F antenna 3 is connected with one end of the variable reactance element 23 through the contact "b" side of the transmitting and receiving switch SW2, and another end of the variable reactance element 23 is grounded. In this case, the variable reactance element 23 is constituted by a varactor diode, and the reactance value thereof is controlled by the controller 10.

Accordingly, upon receiving, the radio signal is received by only the half-wave whip antenna 2 and is then inputted to the radio receiver circuit 21. In this case, by changing the reactance value of the variable reactance element 23, it is possible to change the substantial electric length of the planar inverted-F antenna 3. That is, the planar inverted-F antenna 3 operates as a reflector by setting the electric length of the planar inverted-F antenna 3 to a value larger than that of the half-wave whip antenna 2. On the other hand, the antenna 3 operates as a wave director by setting the electric length of the planar inverted-F antenna 3 to a value smaller than that of the half-wave whip antenna 2. Therefore, the planar inverted-F antenna 3 operates as so-called non-feeding element, and it is possible to change the radiating directivities of an array antenna including the half-wave whip antenna 2 and the planar inverted-F antenna 3 by changing the reactance value of the variable reactance element 23 by the controller 10, and it is also possible to change the direction of the main beam of the radiation pattern.

SECOND MODIFIED PREFERRED EMBODIMENT

Figure 10:
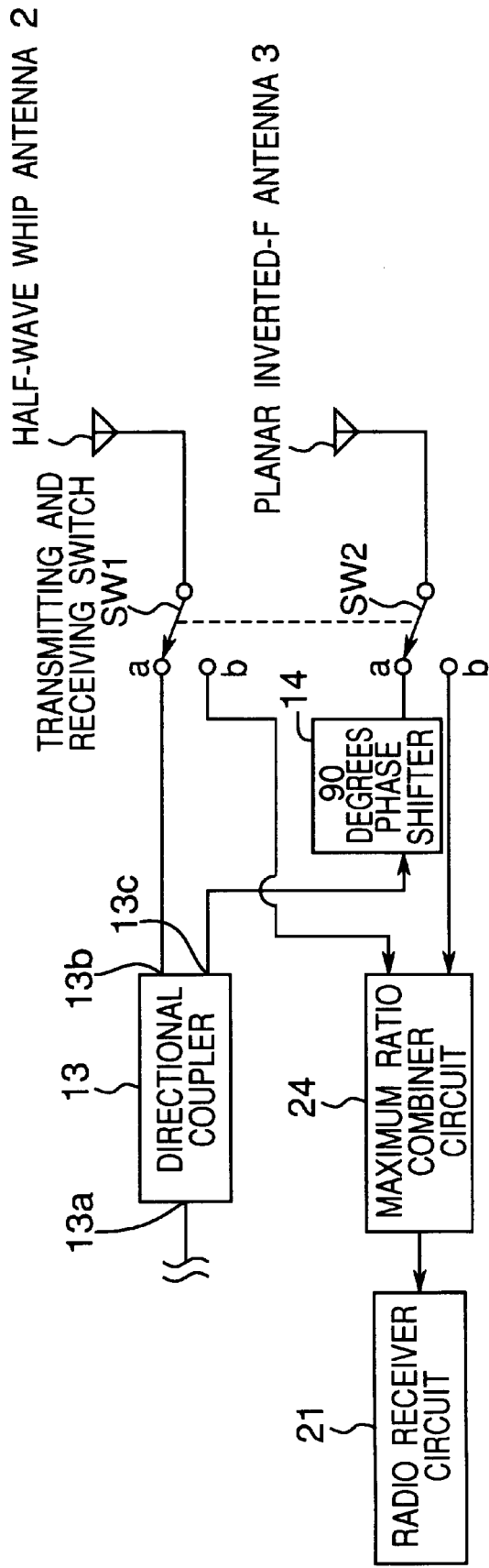
FIG. 10 is a block diagram showing a circuit structure of a portable telephone apparatus which is a second modified preferred embodiment according to the present invention.

FIG. 10 is a block diagram showing a circuit structure of a portable telephone apparatus which is a second modified preferred embodiment according to the present invention. In FIG. 10, the components similar to those of FIG. 2 are denoted by the same numerical references of FIG. 2, and the detailed description thereof is omitted. The second modified preferred embodiment is characterized by comprising a maximum ratio combiner circuit 24 instead of the receiving diversity circuit 22 as compared with the first preferred embodiment shown in FIG. 2. Difference points therebetween will be described in detail hereinafter.

Referring to FIG. 10, a radio signal received by the half-wave whip antenna 2 is inputted to the maximum ratio combiner circuit 24 through the contact "b" side of the transmitting and receiving circuit SW1, while a radio signal received by the planar inverted-F antenna 3 is inputted to the maximum ratio combiner circuit 24 through the contact "b" side of the transmitting and receiving switch SW2. The maximum ratio combiner circuit 24 controls two inputted radio signals so that the power of the combined radio signal becomes the maximum by using the publicly-known maximum ratio combining method, and outputs the combined radio signal to the radio receiver circuit 21.

THIRD MODIFIED PREFERRED EMBODIMENT

Figure 11:
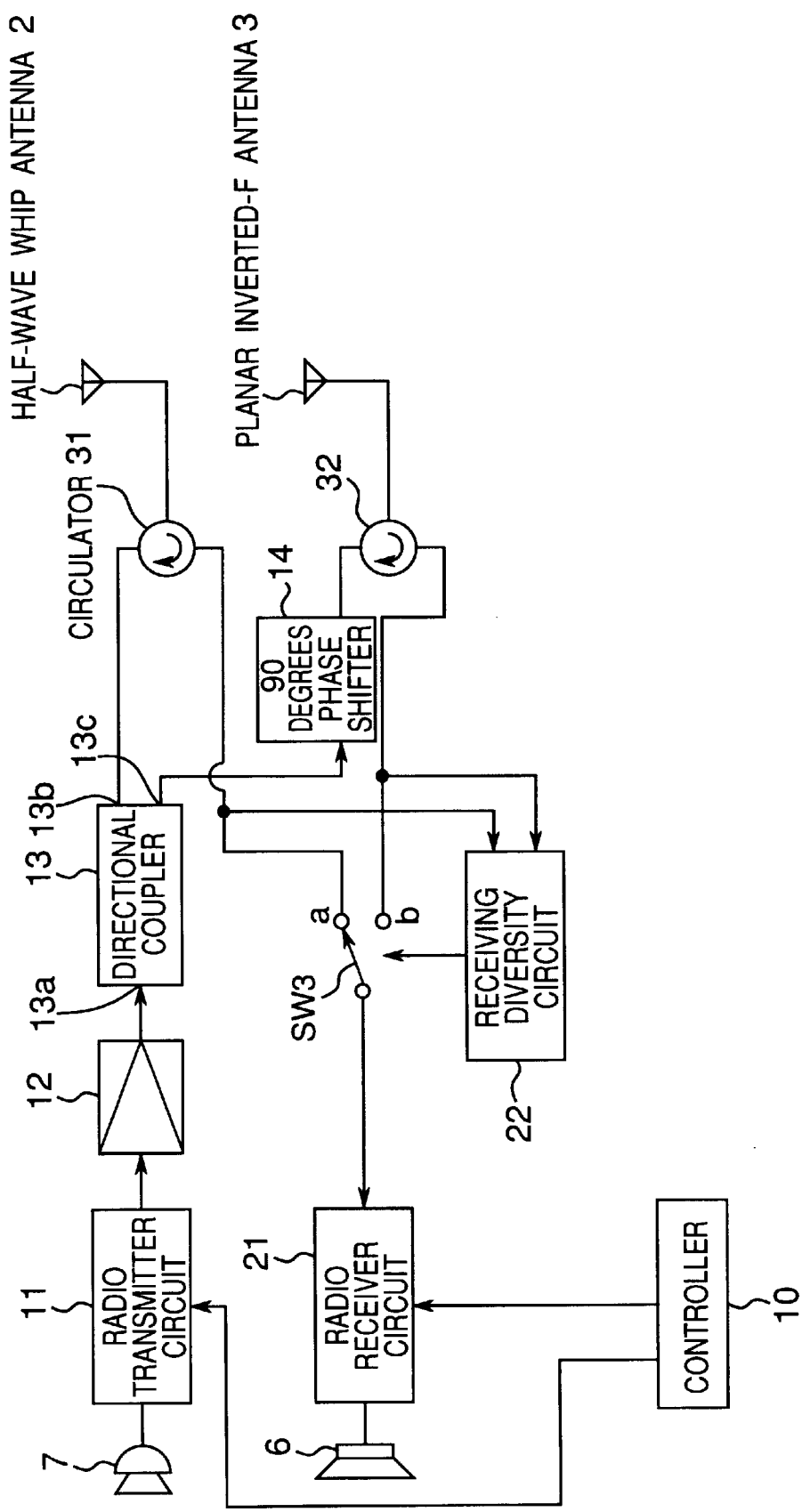
FIG. 11 is a block diagram showing a circuit structure of a portable telephone apparatus which is a third modified preferred embodiment according to the present invention.

FIG. 11 is a block diagram showing a circuit structure of a portable telephone apparatus which is a third modified preferred embodiment according to the present invention. In FIG. 11, the components similar to those of FIG. 2 are denoted by the same numerical references of FIG. 2, and the detailed description thereof is omitted. The third modified preferred embodiment is a portable telephone apparatus which is applied to, for example, a CDMA system, and which is characterized by comprising circulators 31 and 32 each serving as an antenna duplexer, instead of the transmitting and receiving switches SW1 and SW2 as compared with the first preferred embodiment shown in FIG. 2. Difference points therebetween will be described in detail hereinafter.

Referring to FIG. 11, a radio signal outputted from an output terminal 13b of the directional coupler 13 is outputted to the half-wave whip antenna 2 through the circulator 31, and the radio wave of the radio signal is radiated from the half-wave whip antenna 2. Moreover, a radio signal outputted from an output terminal 13c of the directional coupler 13 is outputted to the planar inverted-F antenna 3 through the circulator 32, and the radio wave of the radio signal is radiated from the planar inverted-F antenna 3. On the other hand, a radio signal received by the half-wave whip antenna 2 is inputted to the receiving diversity circuit 22 through the circulator 31, and is further inputted to the radio receiver circuit 21 through the contact "a" side of the diversity switch SW3. Moreover, a radio signal received by the planar inverted-F antenna 3 is inputted to the receiving diversity circuit 22 through the circulator 32, and it is further inputted to the radio receiver circuit 21 through the contact "b" side of the diversity switch SW3.

In the above-described third modified preferred embodiment, full-duplex radio communication can be done by using, for example, the CDMA system. Since any transmitting and receiving switches SW1 and SW2 are not used, the circuit structure thereof is simplified.

FOURTH MODIFIED PREFERRED EMBODIMENT

Figure 12:
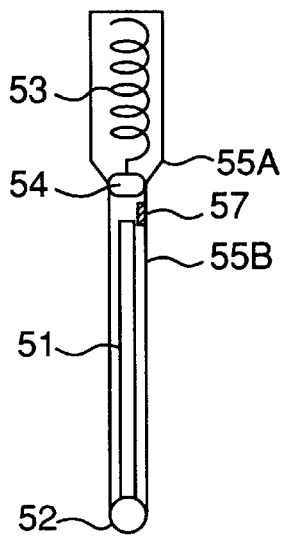
FIG. 12 is a schematic view showing a configuration of an external antenna 50 for a portable telephone apparatus which is a fourth modified preferred embodiment according to the present invention.

FIG. 12 is a schematic view showing a structure of an external antenna 50 for a portable telephone apparatus of a fourth modified preferred embodiment according to the present invention. That is, it is possible to use the external antenna 50 capable of switching over between, for example, a half-wave whip antenna 51 and a helical antenna 53, instead of half-wave whip antenna 2 shown in FIG. 1.

Referring to FIG. 12, the external antenna 50 is mechanically jointed to the top portion of the whip antenna 51 so that the helical antenna 53 is electrically insulated from the whip antenna 51 and extends on a straight line. In this case, the whip antenna 51 is surrounded by a fixing resin 55B so as to be protected, and a connecting terminal 52 is connected with the bottom end of the whip antenna 51. Further, the helical antenna 53 is surrounded by a fixing resin 55A so as to be protected, and a connecting terminal 54 is connected with the bottom end of the helical antenna 53. Moreover, a conductor pattern 57 for detecting that the external antenna 50 is housed is formed on the top surface of the fixing resin 55B of the whip antenna 51.

Figure 13:
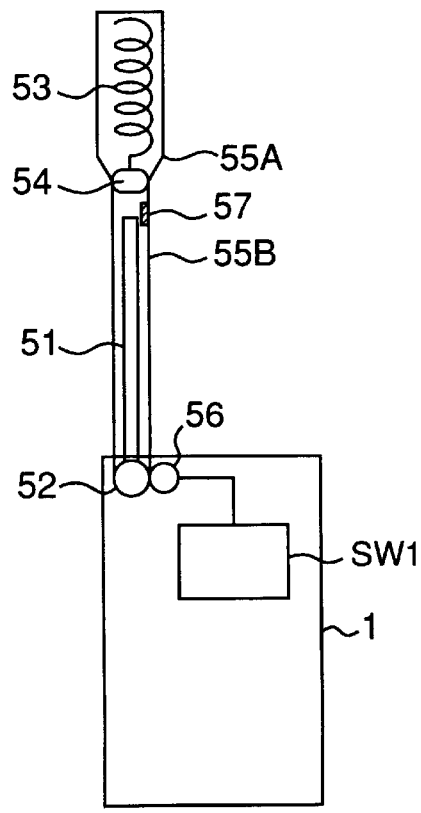
FIG. 13 is a schematic view showing a state when the external antenna 50 of FIG. 12 is extended so as to be separated from a housing 1.
Figure 14:
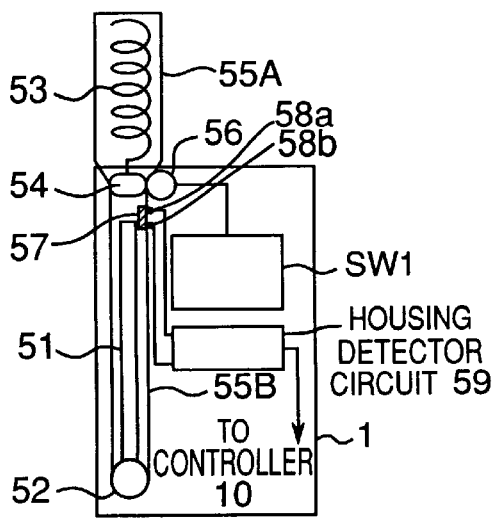
FIG. 14 is a schematic view showing a state when the external antenna 50 of FIG. 12 is housed inside of the housing 1.

Referring to FIG. 13 showing a case of extending the external antenna 50 so as to project from the housing 1, the whip antenna 51 is connected with the transmitting and receiving switch SW1 through the external terminal 52 and an external antenna connecting terminal 56 in the housing 1, and the external antenna connecting terminal 56 operates as a feeding point of the external antenna 50. On the other hand, referring to FIG. 14 showing a case of housing the external antenna 50 inside of the housing 1, the helical antenna 53 is connected with the transmitting and receiving switch SW1 through a connecting terminal 54 and the external antenna connecting terminal 56.

In the fourth modified preferred embodiment constituted as described above, if the external antenna 50 functions as the helical antenna 53, deterioration of the radiating directivity due to the influence of the human body increases, and therefore, such a case of functioning as the helical antenna 53 is detected, then the radiating directivity is controlled so that the main beam of the radiation pattern has the direction opposite to the direction directed to the human body by simultaneously exciting the helical antenna 53 and the planar inverted-F antenna 3 of the internal antenna. In this case, as an example of method for detecting such a case that the external antenna 50 is housed in the housing 1 to function as the helical antenna 53, a pair of connecting terminals 58a and 58b which are different from the external antenna connecting terminal 56 is provided in the housing 1, and a conductor pattern 57 is formed on the surface of the external antenna 50 so as to short-circuit the connecting terminals 58a and 58b when housing the external antenna 50. The short-circuit is detected by a housing detected circuit 59, which then outputs a detection signal to the controller 10. Therefore, the housing detected circuit 59 detects whether or not the external antenna 50 is housed in the housing 1, and outputs the detection signal to the controller 10.

Moreover, in the case of extending the external antenna 50 and in the case of housing the antenna 50, it may be allowed to control optimum radiating directivities corresponding to both the cases, by changing the amplitude ratio and the phase difference between the external antenna 50 and the planar inverted-F antenna 3 of the internal antenna upon transmitting. In particular, it is preferable that only when the housing detected circuit 59 detects that the external antenna 50 functions as the helical antenna 53, the radiating directivity is controlled so that the main beam of the radiation pattern has the direction opposite to the direction directed to the human body by exciting the helical antenna 53 and the planar inverted-F antenna 3 of the internal antenna at the same time. On the other hand, when the housing detected circuit 59 detects that the external antenna 50 functions as the whip antenna 51, only the whip antenna 51 of the external antenna 50 is excited. In the above-mentioned arrangement, when the external antenna 50 functions as the helical antenna 53, it is possible to reduce the deterioration of the radiating directivity due to the influence of the human body. Concretely speaking, when the external antenna 50 functions as the helical antenna 53, it is possible to increase the whole antenna gain by simultaneously exciting these two antennas 51 and 3 and transmitting a radio signal. Further, it is possible to realize a radiation pattern for strongly radiating radio waves in the direction opposite to the direction directed to the head portion of the human body because of transmitting a radio signal by simultaneously exciting these two antennas 51 and 3 by using a predetermined amplitude ratio and a predetermined phase difference so that the main beam of the radiation pattern has the direction substantially opposite to the direction directed to the head of the human body. This leads to reduction of the influence onto the human body as compared with the case of the prior art, and in particular, this leads to remarkable suppression of the amount of radio waves absorbed by the head of the human body.

SECOND PREFERRED EMBODIMENT

Figure 15:
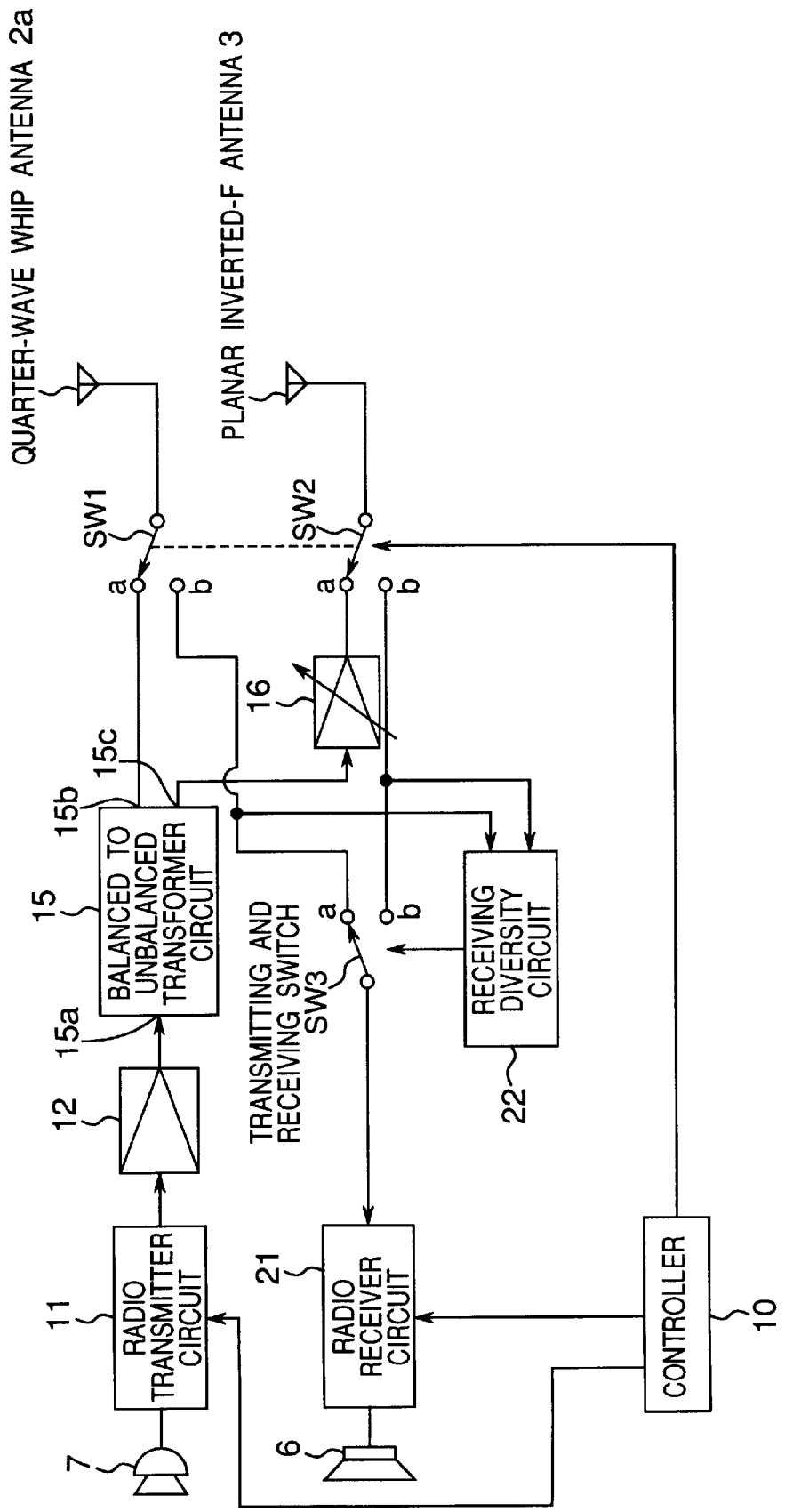
FIG. 15 is a block diagram showing a circuit structure of a portable telephone apparatus which is a second preferred embodiment according to the present invention.

FIG. 15 is a block diagram showing a circuit structure of a portable telephone apparatus which is a second preferred embodiment according to the present invention. FIG. 15, the components similar to those of FIG. 2 are denoted by the same numerical references of FIG. 2, and the detailed description thereof is omitted. The portable telephone apparatus according to the second preferred embodiment is different from the first preferred embodiment shown in FIG. 2 in the following points.

(1) A quarter-wave whip antenna 2a is provided instead of the half-wave whip antenna 2.

(2) A power distributing circuit is provided instead of the directional coupler 13, and a balanced-to-unbalanced transformer circuit 15 referred to as a so-called balun is provided.

(3) A power amplifier 16 of a multiplier is provided instead of the 90 degrees phase shifter 14.

Difference points therebetween will be described in details hereinafter.

In the case of the second preferred embodiment, by provided the quarter-wave whip antenna 2a, the current is maximized at a feeding point, flows through the housing 1, and influences the radiating directivity when considering the current distribution in the case of exciting the quarter-wave whip antenna 2a. However, it is possible to remarkably decrease the antenna length as compared with that of the half-wave whip antenna 2.

Referring to FIG. 15, the balanced-to-unbalanced transformer circuit 15 is constituted by winding three coils around a cylindrical magnetic material, and has one input terminal 15a and two output terminals 15b and 15c. When a radio signal is inputted to the input terminal 15a, the balanced-to-unbalanced transformer circuit 15 distributes a radio signal inputted to the input terminal 15a with a distribution power ratio of 1:1, and then, outputs one distributed radio signal from the output terminal 15b, and outputs another distributed radio signal from the output terminal 15c. It is noted that the distribution power ratio of the balanced-to-unbalance transformer circuit 15 is previously determined, for example, before the circuit 15 is manufactured, and it is set by adjusting the coupling between the two coils so that the distribution power ratio becomes a predetermined value upon manufacturing. A radio signal outputted from the output terminal 15b of the balanced-to-unbalance transformer circuit 15 is outputted to the quarter-wave whip antenna 2a through the contact "a" side of the transmitting and receiving switch SW1, and the electromagnetic wave of the radio signal is radiated from the quarter-wave whip antenna 2a. Moreover, a radio signal outputted from the output terminal 15c of the balanced-to-unbalanced transformer circuit 15 is power-amplified by the power amplifier 16 of the multiplier capable of changing the amplification degree thereof, and thereafter, the radio signal is outputted to the planar inverted-F antenna 3 through the contact "a" side of the transmitting and receiving switch SW2, then the electromagnetic wave of the radio signal is radiated from the planar inverted-F antenna 3. By changing the amplification degree of the power amplifier 16, it is possible to change the amplitude ratio between two radio signals when exciting the two antennas 2 and 3.

In the above-mentioned second preferred embodiment constituted as described above, by setting the phase difference between the antennas 2a and 3 when simultaneously exciting the two antennas 2a and 3 to 180 degrees, it is possible to cancel and reduce the currents simultaneously flowing through these two antennas 2a and 3 at the same time, and thus, this leads to reduction of the current flowing through the housing 1 of the portable telephone apparatus. Therefore, it is possible to reduce the influence of the hand, and to suppress the deterioration of the radiating directivity.

In the above-mentioned second preferred embodiment, there is used the balanced-to-unbalanced transformer circuit 15, however, the present invention is not limited to this. It may be allowed to constitute the second preferred embodiment by using a power equipartition circuit and a 180 degrees phase shifter instead of the balanced-to-unbalanced transformer circuit 15.

In the above-mentioned second preferred embodiment, it is preferable that two antennas have the same length such as ¼ or ½ wavelengths. Thus, it is possible to cancel and reduce the currents simultaneously flowing through these two antennas at the same time, and to reduce the current flowing through the housing of the portable telephone apparatus.

THIRD PREFERRED EMBODIMENT

Figure 16:
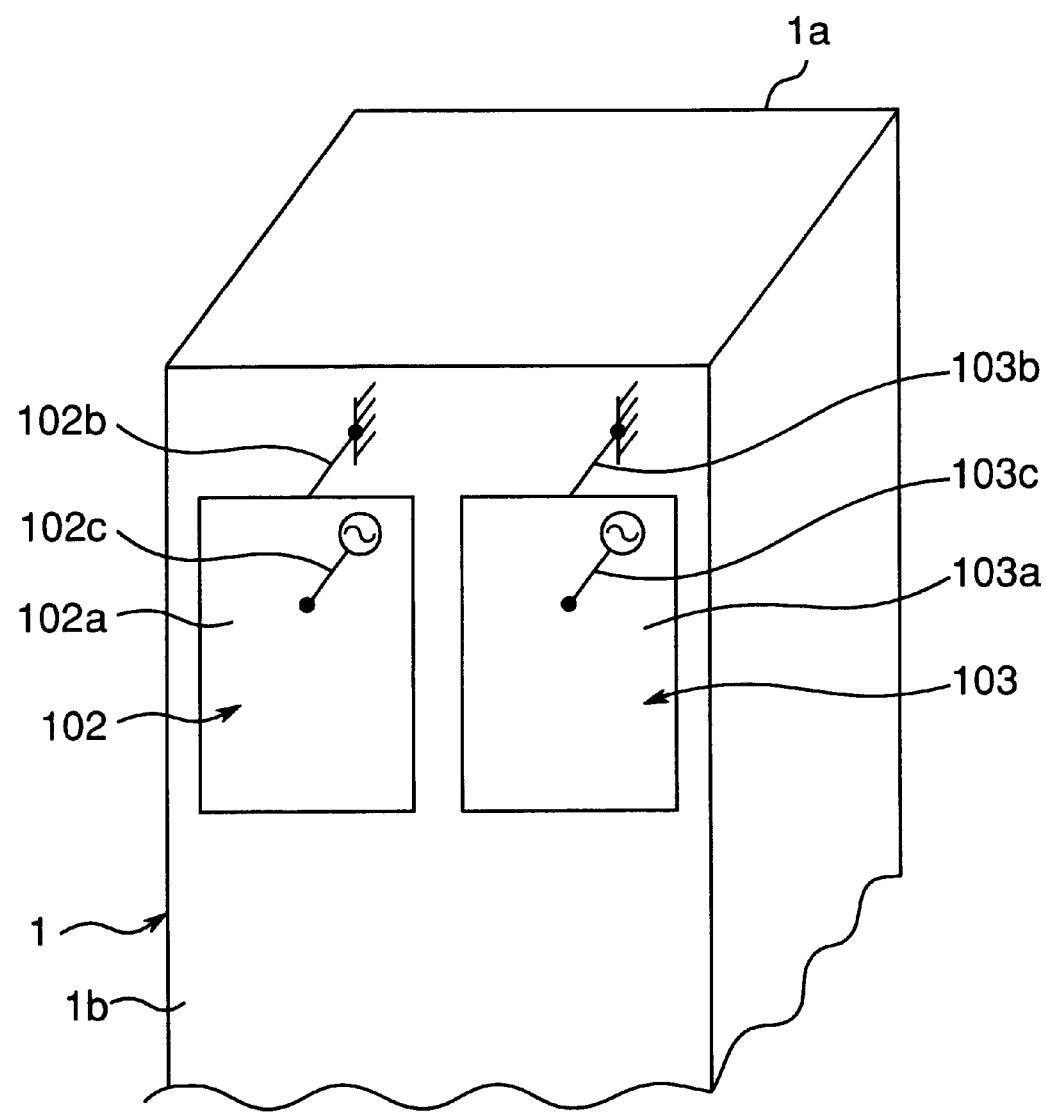
FIG. 16 is a perspective view showing a structure of a portable telephone apparatus which is a third preferred embodiment according to the present invention.

FIG. 16 is a perspective view showing a structure of a portable telephone apparatus that is a third preferred embodiment according to the present invention. In FIG. 16, the third preferred embodiment is characterized in that the radio circuit of the second preferred embodiment is provided, and planar inverted-F antennas 102 and 103 each of an internal antenna are provided at a location located inside of about an upper portion of the housing 1 of the potable telephone apparatus, where the location is in the vicinity of the rear surface 1b so as to oppose to the speaker.

Referring to FIG. 16, the planar inverted-F antenna 102 is constituted by comprising a rectangular conductor plate 102b supported by a short-circuit pin 102b so that the antenna 102 becomes parallel to the rear surface of the housing 1, the central portion of the upper side of the conductor plate 102a is grounded through the short-circuit pin 102b, and the approximately central portion of the conductor plate 102a is connected with the transmitting and receiving switch SW1 through the feeding pin 102c. Moreover, the planar inverted-F antenna 103 is constituted by comprising a rectangular conductor plate 103a supported by a short-circuit pin 103b so that the antenna 103 becomes parallel to the rear surface of the housing 1, the central portion of the upper side of the conductor plate 103a is grounded through the short-circuit pin 103b, and the approximately central portion of the conductor plate 103a is connected with the transmitting and receiving switch SW2 through a feeding pin 103c.

In the above-described third preferred embodiment, it is possible to reduce the housing current and to suppress the deterioration of the radiating directivity due to the hand by constituting the internal antenna by two planar inverted-F antennas 102 and 103 and by exciting the antennas 102 and 103 so that the phase difference therebetween becomes 180 degrees, as shown in FIG. 16. Even in this case, by simultaneously exciting the two planar inverted-F antennas 102 and 103, the radiating directivity is controlled so that the main beam of the radiation pattern has the direction opposite to the direction directed to the human body.

FOURTH PREFERRED EMBODIMENT

Figure 17:
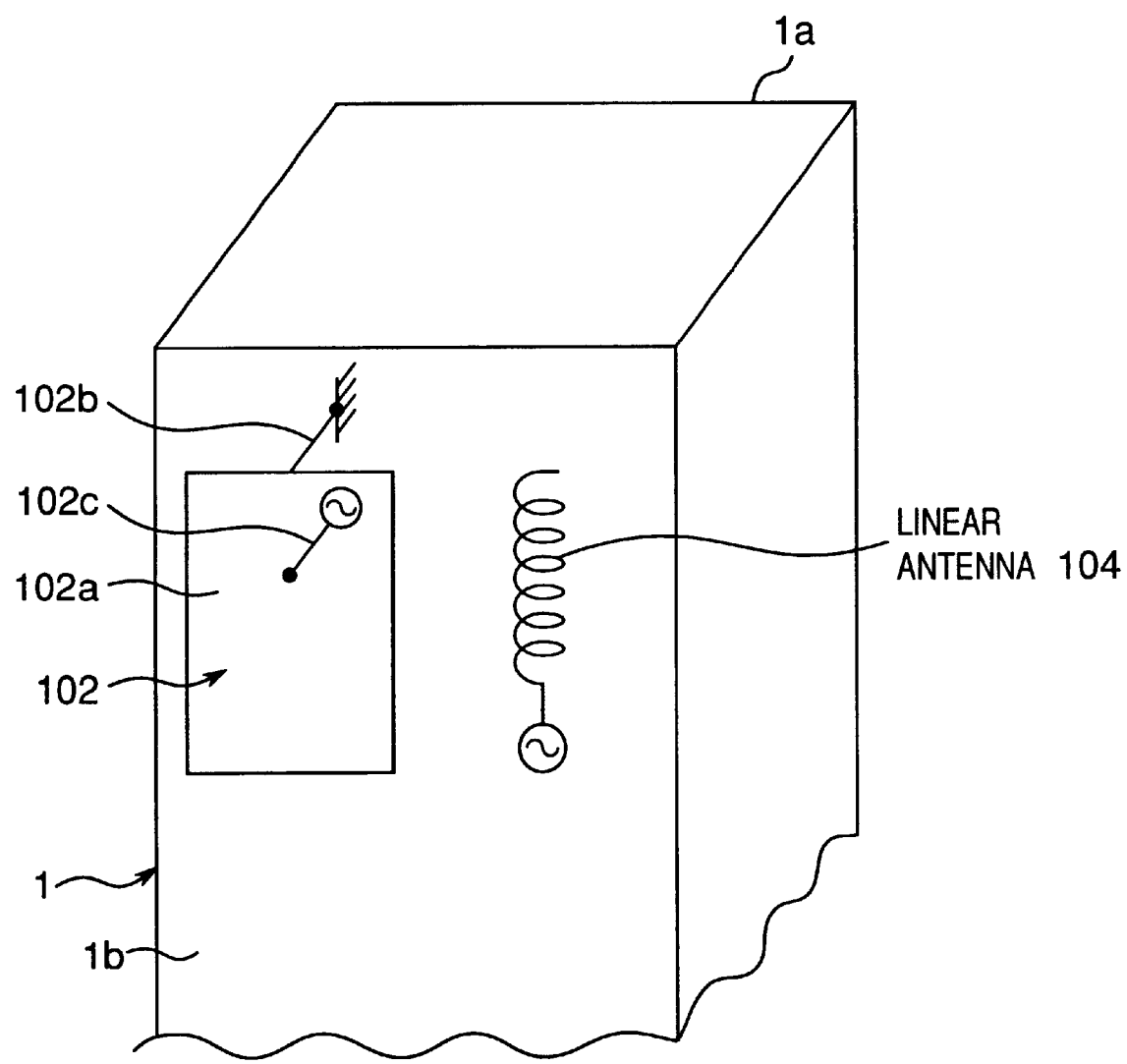
FIG. 17 is a perspective view showing a structure of a portable telephone apparatus which is a fourth preferred embodiment according to the present invention.

FIG. 17 is a perspective view showing a structure of a portable telephone apparatus of a fourth preferred embodiment according to the present invention. The fourth preferred embodiment is characterized by providing a linear antenna 104 such as a helical antenna or meander antenna inside of the housing 1 instead of the planar inverted-F antenna 103, as compared with the third preferred embodiment. This preferred embodiment has action and advantageous effects similar to those of the third preferred embodiment, and allows the area and the volume which are occupied by the antennas to be reduced as compared with those of the third preferred embodiment.

FIFTH PREFERRED EMBODIMENT

Figure 18:
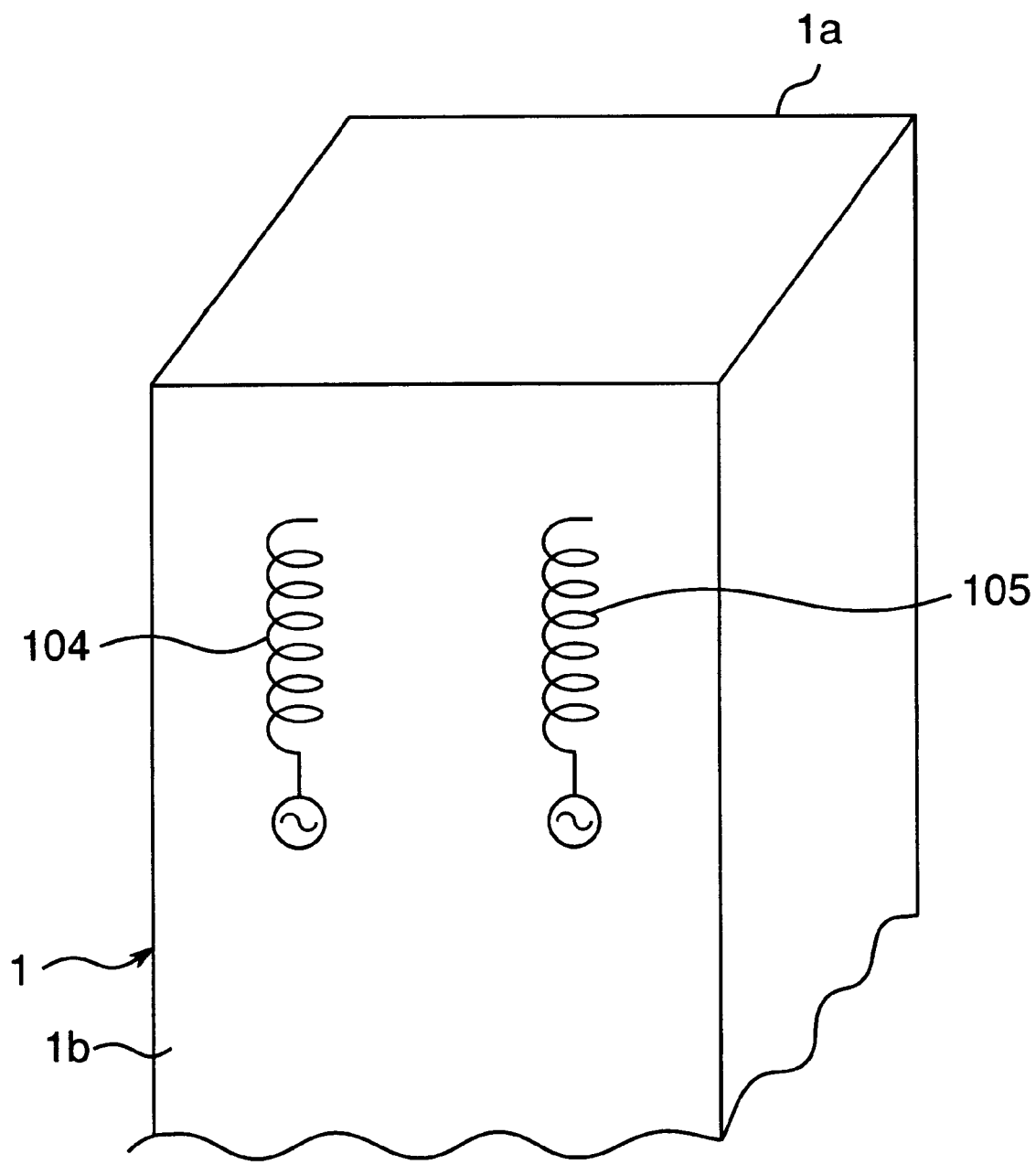
FIG. 18 is a perspective view showing a structure of a portable telephone apparatus which is a fifth preferred embodiment according to the present invention.
Figure 19:
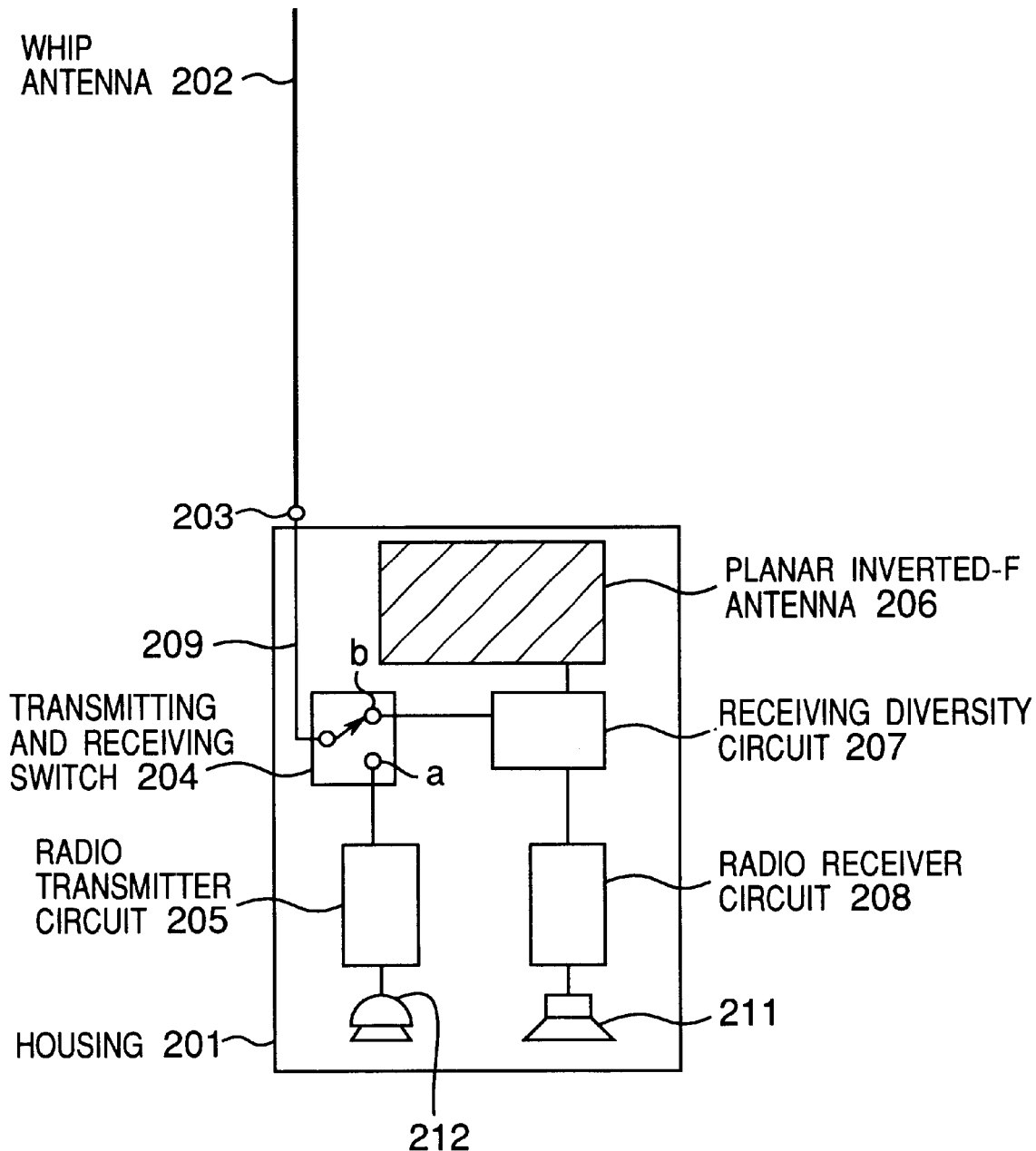
FIG. 19 is a block diagram showing a structure of a portable telephone apparatus of a prior art.

FIG. 18 is a perspective view showing a structure of a portable telephone apparatus of a fifth preferred embodiment according to the present invention. The fourth preferred embodiment is characterized by providing a linear antennas such 104 and 104 as helical antennas or meander antennas inside of the housing 1 instead of two planar inverted-F antennas 102 and 103, as compared with the third preferred embodiment. This embodiment has action and advantageous effects similar to those of the third preferred embodiment, and allows the area and the volume occupied by the antennas to be remarkably reduced as compared with those of the third preferred embodiment.

MODIFIED PREFERRED EMBODIMENTS

In the above-described preferred embodiments, a portable telephone apparatus having two antennas is described, however, the present invention is not limited to this. It may be provided with three or more antennas.

In the above-described preferred embodiments, a half-wave antenna is used as a half-wave whip antenna, however, the present invention is not limited to this. It may use a linear antenna such as a helical antenna or meander antenna, a microstrip antenna, or a patch antenna etc.

In the above-described preferred embodiments, a quarter-wave whip antenna or a planar inverted-F antenna is used as a quarter-wave antenna, however, the present invention is not limited to this. It may use a linear antenna such as a helical antenna or meander antenna, a microstrip antenna, or a patch antenna etc.

In the above-described preferred embodiments, in each of the planar inverted-F antennas 3, 102, and 103, the short-circuit pin is arranged at the central portion of the upper rim part, and the feeding pin is arranged at almost the central portion of the conductor plate. However, the present invention is not limited to this. It may replace the short-circuit pin and the feeding pin with each other, and may change these arranging positions for impedance matching. Moreover, the pin arranged at the rim part is not limited to arrangement at the upper rim part, and it may be arranged at a lower rim part, a left rim part, or a right rim part.

INDUSTRIAL APPLICABILITY

As described above, according to the present invention, it comprises transmitting means for transmitting radio signals by simultaneously exciting at least two antennas with a predetermined amplitude ratio and a predetermined phase difference so that a main beam of a radiation pattern has a direction substantially opposite to an audio radiating direction from a speaker, and the transmitting means transmits the radio signals by simultaneously exciting the respective antennas with a predetermined amplitude ratio and a predetermined phase difference so that an mean effective gain becomes larger than that when exciting one antenna. Accordingly, it is possible to realize the radiating directivity for strongly radiating radio waves in the direction opposite to the head of the human body of the user, thereby reducing the deterioration of the radiating directivity of the antenna when making the portable telephone apparatus approach to the human body. Moreover, by exciting at least two antennas so that the mean effective gain increases, it is possible to realize the radiating directivity of the antenna suitable for multiple waves propagation environment.

Moreover, the transmitting means makes it possible to remarkably decrease radiation toward the head of the human body and to reduce the amount of radio waves absorbed by the head by constituting the transmitting means so as to excite the respective antennas only upon transmitting for telephone speech or realizing the radiating directivity for strongly radiating radio waves in the direction opposite to the head when housing the external antenna in the housing or only upon transmitting to the antenna for performing diversity reception upon receiving. Furthermore, by setting the phase difference between two antennas when simultaneously exciting the same two antennas to 180 degrees, it is possible to reduce the current flowing through the housing of the portable telephone apparatus, to reduce the influence of the hand, and to remarkably suppress the deterioration of the radiating directivity.

What is claimed is:

1. A portable telephone apparatus comprising:
   at least two antennas; and
   transmitting means for transmitting radio signals by simultaneously exciting said at least two antennas with a predetermined amplitude ratio and a predetermined phase difference so that a main beam of a radiation pattern has a direction substantially opposite to an audio radiating direction from a speaker.

2. The portable telephone apparatus as claimed in claim 1, wherein said transmitting means transmits the radio signals by simultaneously exciting said at least two antennas with a predetermined amplitude ratio and a predetermined phase difference so that a mean effective gain becomes larger than that when exciting one of said at least two antennas.

3. The portable telephone apparatus as claimed in claim 1, wherein said transmitting means excites said at least two antennas only for transmission of telephone speech.

4. The portable telephone apparatus as claimed in claim 1, further comprising:
receiving means for receiving radio signals by using said at least two antennas, and selectively receiving a radio signal having a highest level among the radio signals received by said at least two antennas, using a diversity receiving system.

5. The portable telephone apparatus as claimed in claim 1, wherein said at least two antennas include an external antenna provided outside of a housing of said portable telephone apparatus, and an internal antenna built in the housing of said portable telephone apparatus.

6. The portable telephone apparatus as claimed in claim 5, wherein said external antenna is a whip antenna and said internal antenna is a planar inverted-F antenna.

7. The portable telephone apparatus as claimed in claim 5, wherein said external antenna comprises a whip antenna and a helical antenna which are mechanically joined with each other so as to be electrically insulated from each other,
wherein said helical antenna is connected with a radio circuit of said portable telephone apparatus when said external antenna is housed in the housing of said portable telephone apparatus, and said whip antenna is connected with the radio circuit of said portable telephone apparatus when said external antenna is extended,
wherein said portable telephone apparatus further comprises detecting means for detecting whether or not said external antenna is housed in the housing of said portable telephone apparatus, and
wherein said transmitting means simultaneously excites said external antenna and said internal antenna with the predetermined amplitude ratio and the predetermined phase difference so that the main beam of the radiation pattern has the direction substantially opposite to the audio radiating direction from the speaker when said detecting means detects that said external antenna is housed in the housing of said portable telephone apparatus, and said transmitting means excites only said external antenna when said detecting means detects that said external antenna is not housed in the housing of said portable telephone apparatus.

8. The portable telephone apparatus as claimed in claim 1, wherein said transmitting means excites said at least two antennas with phases opposite to each other.

9. The portable telephone apparatus as claimed in claim 8, wherein said at least two antennas include two quarter-wave antennas.

10. The portable telephone apparatus as claimed in claim 8, wherein said at least two antennas include two half-wave antennas.

11. The portable telephone apparatus as claimed in claim 8, wherein said at least two antennas are internal antennas built in the housing of said portable telephone apparatus.

12. A control method of a telephone apparatus, said control method comprising:
controlling transmitting of the telephone apparatus so as to transmit radio signals by simultaneously exciting at least two antennas with a predetermined amplitude ratio and a predetermined phase difference so that a main beam of a radiation pattern has a direction substantially opposite to an audio radiating direction from a speaker.

13. The control method of the telephone apparatus as claimed in claim 12,
wherein said controlling of the transmitting of the telephone apparatus comprises transmitting the radio signals by simultaneously exciting the at least two antennas with the predetermined amplitude ratio and the predetermined phase difference so that a mean effective gain becomes larger than that when exciting one of the at least two antennas.

14. The control method of the telephone apparatus as claimed in claim 12,
wherein said controlling of the transmitting excites the at least two antennas only for transmission of telephone speech.

15. The control method of the telephone apparatus as claimed in claim 12, further comprising:
controlling receiving of the telephone apparatus so as to receive radio signals by using the at least two antennas, and selectively receive a radio signal having a highest level among the radio signals received by the at least two antennas, using a diversity receiving system.

16. The control method of the telephone apparatus as claimed in claim 12,
wherein the at least two antennas include an external antenna provided outside of a housing of the telephone apparatus, and an internal antenna built in the housing of the telephone apparatus.

17. The control method of the telephone apparatus as claimed in claim 16,
wherein the external antenna is a whip antenna, and the internal antenna is a planar inverted-F antenna.

18. The control method of the telephone apparatus as claimed in claim 17,
further comprising detecting whether or not the external antenna is housed in the housing of the telephone apparatus,
wherein the external antenna comprises a whip antenna and a helical antenna which are mechanically joined to each other so as to be electrically insulated from each other,
wherein the helical antenna is connected with a radio circuit of the telephone apparatus when the external antenna is housed in the housing of the telephone apparatus, and the whip antenna is connected with the radio circuit of the telephone apparatus when the external antenna is extended, and
wherein said controlling of the transmitting simultaneously excites the external antenna and the internal antenna with the predetermined amplitude ratio and the predetermined phase difference so that the main beam of the radiation pattern has the direction substantially opposite to the audio radiating direction from the speaker when said detecting detects that the external antenna is housed in the housing of the telephone apparatus, while said controlling of the transmitting excites only the external antenna when said detecting detects that the external antenna is not housed in the housing of the telephone apparatus.

19. The control method of the telephone apparatus as claimed in claim 12, wherein said controlling of the transmitting excites the at least two antennas with phases opposite to each other.

20. The control method of the telephone apparatus as claimed in claim 19,
wherein the at least two antennas include two quarter-wave antennas.

21. The control method of the telephone apparatus as claimed in claim 19,
wherein the at least two antennas include two half-wave antennas.

22. The control method of the telephone apparatus as claimed in claim 19,
wherein the at least two antennas are internal antennas built in the housing of the telephone apparatus.

* * * * *

UNITED STATES PATENT AND TRADEMARK OFFICE
CERTIFICATE OF CORRECTION

PATENT NO. : 6,731,920 B1
DATED : May 4, 2004
INVENTOR(S) : Hiroshi Iwai et al.

It is certified that error appears in the above-identified patent and that said Letters Patent is hereby corrected as shown below:

<u>Title page,</u>
Item [56], References Cited, FOREIGN PATENT DOCUMENTS, replace
"JP 2001-1129238 4/2001" with -- JP 2001-119238 4/2001 --.

Signed and Sealed this

Fifteenth Day of March, 2005

JON W. DUDAS
*Director of the United States Patent and Trademark Office*